United States Patent
Yasui

(10) Patent No.: US 10,493,703 B2
(45) Date of Patent: Dec. 3, 2019

(54) SUPPORTING STRUCTURE FOR FORCE TRANSMISSION MEMBER, AIRCRAFT REACTION LINK, FLIGHT CONTROL SURFACE DRIVING UNIT, METHOD OF MOUNTING FORCE TRANSMISSION MEMBER, AND METHOD OF MANUFACTURING AIRCRAFT REACTION LINK

(71) Applicant: NABTESCO CORPORATION, Tokyo (JP)

(72) Inventor: Tsutomu Yasui, Gifu-ken (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 15/334,965

(22) Filed: Oct. 26, 2016

(65) Prior Publication Data
US 2017/0130764 A1     May 11, 2017

(30) Foreign Application Priority Data
Nov. 5, 2015   (JP) .................. 2015-217581

(51) Int. Cl.
*B29C 70/30*     (2006.01)
*B64C 13/30*    (2006.01)
(Continued)

(52) U.S. Cl.
CPC ............. *B29C 70/30* (2013.01); *B29C 70/86* (2013.01); *B64C 9/02* (2013.01); *B64C 13/30* (2013.01);
(Continued)

(58) Field of Classification Search
CPC .......... F16C 7/02; F16C 7/7026; B29C 70/30; B29C 70/845; B29C 70/86; B29C 9/02
See application file for complete search history.

(56) References Cited

U.S. PATENT DOCUMENTS

| 3,111,569 A | 11/1963 | Rubenstein |
| 4,183,261 A * | 1/1980 | Eiselbrecher ......... B29C 53/564 74/579 R |

(Continued)

FOREIGN PATENT DOCUMENTS

| JP | 55-90795 A | 7/1980 |
| JP | 2014-237429 A | 12/2014 |
| WO | 2010024990 A1 | 3/2010 |

OTHER PUBLICATIONS

Office Action dated Mar. 11, 2019 issued in corresponding French Patent Application No. 1660504.
(Continued)

*Primary Examiner* — Thomas C Diaz
(74) *Attorney, Agent, or Firm* — Pillsbury Winthrop Shaw Pittman, LLP

(57) ABSTRACT

One object is to provide a supporting structure for a force transmission member, an aircraft reaction link, a flight control surface driving unit, a method of mounting a force transmission member, and a method of manufacturing aircraft reaction link that enable weight reduction while ensuring necessary strength. In accordance with one aspect, the reaction link includes a bush and a link body formed of a fiber-reinforced plastic and supporting the bush. The link body includes a supporting portion supporting the bush, and the fibers included in the supporting portion are continuous.

17 Claims, 17 Drawing Sheets

(51) Int. Cl.
  *B29C 70/86* (2006.01)
  *B64C 9/02* (2006.01)
  *F16C 7/02* (2006.01)
  B29K 307/04 (2006.01)
  B29L 31/30 (2006.01)
  B29L 31/06 (2006.01)

(52) U.S. Cl.
  CPC .......... *F16C 7/026* (2013.01); *B29K 2307/04* (2013.01); *B29L 2031/06* (2013.01); *B29L 2031/3076* (2013.01); *Y02T 50/43* (2013.01); *Y02T 50/44* (2013.01)

(56) References Cited

U.S. PATENT DOCUMENTS

| | | | |
|---|---|---|---|
| 4,256,412 A | | 3/1981 | Tybus et al. |
| 4,704,918 A | | 11/1987 | Orkin et al. |
| 4,992,313 A | * | 2/1991 | Shobert ................ B29C 53/582 |
| | | | 428/36.1 |
| 6,116,113 A | | 9/2000 | Pazdirek et al. |
| 6,324,940 B1 | * | 12/2001 | Pazdirek ............... B29C 53/585 |
| | | | 174/47 |
| 2014/0332626 A1 | | 11/2014 | Saito et al. |

OTHER PUBLICATIONS

Notice of Reasons for Refusal dated Sep. 10, 2019 issued in corresponding Japanese Patent Application No. 2015-217581 with English translation.

* cited by examiner

SUPPORTING STRUCTURE FOR FORCE TRANSMISSION MEMBER, AIRCRAFT REACTION LINK, FLIGHT CONTROL SURFACE DRIVING UNIT, METHOD OF MOUNTING FORCE TRANSMISSION MEMBER, AND METHOD OF MANUFACTURING AIRCRAFT REACTION LINK

CROSS-REFERENCE TO RELATED APPLICATIONS

This application is based on and claims the benefit of priority from Japanese Patent Application Serial No. 2015-217581 (filed on Nov. 5, 2015), the contents of which are hereby incorporated by reference in their entirety.

TECHNICAL FIELD

The present invention relates to a supporting structure for a force transmission member, an aircraft reaction link, a flight control surface driving unit, a method of mounting a force transmission member, and a method of manufacturing aircraft reaction link.

BACKGROUND

Aircrafts are provided with flight control surfaces including primary control surfaces formed as rudder faces such as ailerons, rudders, or elevators and secondary control surfaces such as flaps or spoilers. Flight control surface driving units for driving these flight control surfaces are provided with an actuator mounted on a flight control surface and an aircraft reaction link swingably connected to the actuator and the flight control surface.

For reducing the weight of aircrafts, many aircraft components made of metal materials such as titanium alloys are being replaced with those made of fiber-reinforced plastics. Among these components, some reaction links are known to be made of fiber-reinforced plastics instead of metal materials (see Japanese Patent Application Publication No. 2014-237429).

One example of such aircraft reaction links is the reaction link 200 shown in FIG. 19*a*, which includes a link body 210 connecting between a flight control surface and an actuator and bushes 220 for slidably supporting a connection shaft of the actuator. The link body 210 is made of a fiber-reinforced plastic. The bushes 220 are connected to the end portions of the link body 210 via fasteners 230. More specifically, each of the end portions of the link body 210 has a pair of planar plates. Each pair of planar plates 211 has a through-hole 212 into which a fastener 230 is inserted (see FIG. 19*b*). The bush 220 is partly inserted between the pair of planar plates 211. A fastener 230 is inserted into the through-hole 212 to fasten the bush 220 and the pair of planar plates 211 together.

The end portion of the link body 210 includes first fibers 241 and second fibers 242. The first fibers 241 extend in a first direction DR1 in which the link body 210 extends as shown in FIG. 19*b*. The second fibers 242 extend in a second direction DR2 orthogonal to the first direction DR1. However, since the pair of planar plates 211 have a through-hole formed therein, the first fibers 241 of the link body 210 in the shaded region in FIG. 19*b* are cut by the through-hole 212 and thus cannot withstand the tensile load imparted on the bush 220 (the load imparted in the direction of the white arrow in FIG. 19*b*). Therefore, the tensile load imparted on the bush 220 is withstood mainly by the second fibers 242 positioned more distally in the end portion of the link body 210 than the through-hole 212.

To overcome such a problem, conventional aircraft reaction links have been configured to increase the number of layers of the second fibers 242 positioned more distally in the end portion of the link body 210 than the through-hole 212 or increase the area of a part of the end portion more distal than the through-hole 212, so as to increase the supporting force for the bush 220. However, in the conventional aircraft reaction links, the end portion of the link body 210 has a larger size, resulting in a larger weight of the reaction link. Such a defect is not specific to aircraft reaction links but is common to supporting structures for force transmission members in which a force transmission member such as a bush for transmitting a force is supported by a fiber-reinforced plastic.

SUMMARY

One object of the present invention is to provide a supporting structure for a force transmission member, an aircraft reaction link, a flight control surface driving unit, a method of mounting a force transmission member, and a method of manufacturing aircraft reaction link that enable weight reduction while ensuring necessary strength.

(1) In an embodiment of the force transmission member supporting structure according to the present invention, a structural member supports a force transmission member, the structural member being made of a fiber-reinforced plastic including continuous fibers, the force transmission member being configured to transmit a force, wherein the continuous fibers included in the fiber-reinforced plastic support the force transmission member against the force.

If the fibers around the force transmission member, particularly those extending in such a direction as to be subjected to a tensile load dragging the structural member are cut, the fibers around the force transmission member cannot receive the tensile load imparted to the force transmission member. In the force transmission member supporting structure of the present invention, the fibers extending in such a direction as to be subjected to a tensile load dragging the structural member are continuous. Therefore, more fibers can receive the tensile load imparted to the force transmission member. Accordingly, since there is no need of excessively reinforcing a portion of the structural member supporting the force transmission member, it is possible to ensure the necessary strength and reduce the weight of the portion of the structural member supporting the force transmission member. Supporting a member refers to retaining the member so as to produce a force in a direction against the imparted force. The direction of the imparted force corresponds to the direction of the vector that is an aggregate of the direction vectors of the fibers.

(2) In an embodiment of the force transmission member supporting structure, the fibers supporting the force transmission member are wound around the force transmission member. With this arrangement, when a tensile load dragging the structural member is imparted to the force transmission member, the fibers extending from the structural member and wound around the force transmission member can receive the tensile load imparted to the force transmission member. The fibers supporting the force transmission member receive a force dragging the fibers in the direction in which the fibers extend. Since the fibers are strongest against a tensile force in the direction in which the fibers extend, and in addition, the fibers are wound around the force transmission member, the force can be received more efficiently. Accordingly, the force transmission member can be supported stably with a smaller number of fibers, thereby to further effectively ensure necessary strength and reduce the weight of the force transmission member supporting structure.

(3) In an embodiment of the force transmission member supporting structure, the fibers included in the structural member include first fibers extending in a first direction and second fibers extending in a second direction different from the first direction, and the first fibers and the second fibers are woven together.

With this arrangement, the frictional force acting between the first fibers and the second fibers when a force is imparted in the direction in which the fibers extend increases the binding force between the fibers, as compared to an arrangement in which the first fibers and the second fibers are not woven together, that is, one of the first fibers and the second fibers is formed on the other of the first fibers and the second fibers. Therefore, the strength of the structural member can be increased.

(4) In an embodiment of the force transmission member supporting structure, angles of the fibers formed by the first direction and the second direction with a longitudinal direction of the structural member in a portion of the structural member close to the force transmission member are smaller than those in a portion of the structural member distant from the force transmission member.

With this arrangement, angles of the fibers in a portion of the structural member close to the force transmission member are smaller (the fibers extend in directions closer to the longitudinal direction of the structural member). Therefore, when the fibers supporting the force transmission member are wound around the force transmission member, the first fibers and the second fibers are restrained from being bent or twisted. Accordingly, the deformation of the structural member due to the tensile load can be restrained, and the force transmission member can be supported more firmly.

(5) In an embodiment of the force transmission member supporting structure, the angles of the fibers in the structural member are indiscreetly smaller toward the force transmission member. With this arrangement, manufacture of the structural member is facilitated as compared to the case where the angles of the fibers in the structural member vary discretely toward the force transmission member. Particularly as compared to the case where the angles of the fibers are acutely reduced in a portion close to the force transmission member, the first fibers 61 and the second fibers 62 may be restrained from being bent or twisted acutely.

(6) In an embodiment of the force transmission member supporting structure, the first fibers and the second fibers are wound around the force transmission member, and a direction of winding the first fibers around the force transmission member is opposite to a direction of winding the second fibers around the force transmission member.

With this arrangement, the direction of the first fibers is opposite to the direction of the second fibers, and thus these fibers are not excessively bent or twisted. The tensile load can be withstood in a good balance in the longitudinal direction of the structural member.

(7) In an embodiment of the force transmission member supporting structure, the first direction and the second direction are different from a longitudinal direction of the structural member, and the fibers included in the structural member further include third fibers extending along the longitudinal direction and wound around the force transmission member.

With this arrangement, the third fibers extend in the longitudinal direction, and thus at least a part of the third fibers is prevented from being excessively bent or twisted when wound around the force transmission member. Thus, when a tensile load drags the force transmission member away from the structural member, the tensile load can be efficiently received in the direction in which the third fibers extend. Accordingly, the third fibers can support the force transmission member more firmly.

(8) In an embodiment of the force transmission member supporting structure, the third fibers include fibers wound around the force transmission member in a first winding direction and fibers wound around the force transmission member in a second winding direction opposite to the first winding direction.

With this arrangement, Therefore, the portion of the third fibers at which the third fibers start to be wound around the force transmission member is not excessively bent or twisted as compared to the case where the third fibers are wound around the force transmission member in one direction. The tensile load can be withstood in a good balance in the longitudinal direction of the structural member.

(9) In an embodiment of the force transmission member supporting structure, only the third fibers are wound around the force transmission member. With this arrangement, only the third fibers are wound around the force transmission member, while the first fibers and the second fibers are not. Therefore, the winding work is reduced, and productivity of the supporting structure for the force transmission member can be increased.

(10) In an embodiment of the force transmission member supporting structure, the fibers wound around the force transmission member form layers stacked together. With this arrangement, the fibers wound around the force transmission member form layers stacked together, the area of the portion of the force transmission member on which the fibers are wound can be restrained from being increased. Accordingly, it may be possible to ensure the necessary strength and reduce the weight of the force transmission member.

(11) In an embodiment of the force transmission member supporting structure, all of the fibers included in the structural member are wound around the force transmission member. With this arrangement, all of the fibers included in the structural member support the force transmission member, and thus a tensile load produced between the structural member and the force transmission member is received by all of the fibers. Therefore, the force transmission member can be supported more firmly with a smaller number of fibers, and it is possible to ensure the necessary strength and reduce the weight of the supporting structure for the force transmission member more efficiently.

(12) In an embodiment of the force transmission member supporting structure, only a part of the fibers included in the structural member is wound around the force transmission member. With this arrangement, only a part of the fibers included in the structural member is wound around the force transmission member, and thus winding work is reduced as compared to the case where all of the fibers included in the structural member are wound around the force transmission member. Therefore, the productivity of the supporting structure for the force transmission member can be increased while maintaining the balance of the strength and the weight of the supporting structure for the force transmission member.

(13) In an embodiment of the force transmission member supporting structure, the force transmission member includes a projection capable of being inserted into an opening portion formed in a distal end portion of the structural member, and the projection is tapered toward an end thereof.

With this arrangement, when a compressive load in a direction of compressing the opening portion of the structural member is imparted to the force transmission member, the tapers of the projection contact with the opening portion of the structural member, such that the structural member can support the force transmission member.

(14) In an embodiment of the force transmission member supporting structure, a reinforcement member for reinforcing fixation between the structural member and the force transmission member is provided on a portion of the opening portion overlapping the projection.

With this arrangement, the reinforcement member fixes the structural member and the force transmission member, and thus the force transmission member can be restrained from moving relative to the structural member. In addition, when a compressive load in a direction of pressing the force transmission member toward the structural member is imparted to the force transmission member, the structural member can support the force transmission member more firmly.

(15) In an embodiment of the force transmission member supporting structure, the reinforcement member is made of a continuous fiber included in the fiber-reinforced plastic and is wound on an outer side of the fibers supporting the force transmission member. The outer side of the fibers refers to the side close to the outer surface.

With this arrangement, when a compressive load in a direction of compressing the opening portion of the structural member is imparted to the force transmission member, the reinforcement member can prevent the widening of the opening portion of the structural member. As a result, the structural member and the force transmission member can be supported firmly without increase of the size of the supporting structure for the force transmission member.

(16) In an embodiment of the force transmission member supporting structure, the fiber of the reinforcement member is wound regularly. With this arrangement, the portion provided with the reinforcement member can be restrained from excessively expanding from the structural member. Thus, increase of the size of the supporting structure for the force transmission member can be restrained.

(17) In an embodiment of the force transmission member supporting structure, the reinforcement member fixes end portions of the fibers supporting the force transmission member. With this arrangement, the fibers supporting the force transmission member with the reinforcement member can be restrained from being removed from the structural member. That is, although fiber-reinforced plastics generally tend to be removed, the fibers can be effectively prevented from being removed, by reinforcing the end portions of the fibers.

(18) In an embodiment of the force transmission member supporting structure, the opening portion formed in the distal end portion of the structural member has a tapered shape with an opening area thereof larger toward a distal end of the opening portion.

With this arrangement, when a compressive load in a direction of compressing the opening portion of the structural member is imparted to the force transmission member, the tapers of the opening portion of the structural member contact with the projection of the force transmission member, such that the structural member can support the force transmission member. In addition, when the projection is provided with tapers, the tapers of the projection are in surface contact with the tapers of the opening portion of the structural member. Thus, when a compressive load is imparted to the force transmission member, the structural member can support the force transmission member more firmly.

(19) In an embodiment of the force transmission member supporting structure, the force transmission member has an outer peripheral surface around which the fibers are wound, and both axial ends of the outer peripheral surface of the force transmission member are provided with a rib extending from the outer peripheral surface of the force transmission member in a radial direction.

With this arrangement, when the fibers for supporting the force transmission member are wound around the force transmission member, the fibers are restrained from deflecting from the force transmission member. Thus, winding of the fibers around the force transmission member can be facilitated.

(20) In an embodiment of the aircraft reaction link according to the present invention, the aircraft reaction link is directly or indirectly mounted on a flight control surface of an aircraft and connected to an actuator for driving the flight control surface, and the aircraft reaction link includes: a bush serving as a force transmission member supporting the actuator slidably; and a link body including a structural member supporting the bush, wherein the force transmission member supporting structure described in (1) above is used for the link body to support the bush.

This arrangement produces the same effect as the above supporting structure for the force transmission member, and therefore, it is possible to ensure the necessary strength and reduce the weight of the aircraft reaction link.

(21) In an embodiment of the flight control surface driving unit according to the present invention, the flight control surface driving unit includes the aircraft reaction link described above and the actuator. This arrangement produces the same effect as the above aircraft reaction link, and therefore, it is possible to ensure the necessary strength and reduce the weight of the flight control surface driving unit.

(22) In an embodiment of the method of mounting a force transmission member according to the present invention, the method of mounting a force transmission member on a structural member, the force transmission member being configured to transmit a force, the structural member being made of a fiber-reinforced plastic and supporting the force transmission member, the method includes: a winding step to wind fibers around a core to form the structural member; a temporary fixation step to wind the fibers around the force transmission member continuously; a resin impregnation step to impregnate the fibers with a resin; and a final fixation step to set the resin permeating the fibers to fix the structural member and the force transmission member.

With this arrangement, mounting of the force transmission member on the structural member can be facilitated. As a result, the supporting structure for the force transmission member having necessary strength and a reduced weight can be produced at low costs.

(23) In an embodiment of the method of manufacturing an aircraft reaction link according to the present invention, the method of manufacturing an aircraft reaction link, the aircraft reaction link being directly or indirectly mounted on a flight control surface of an aircraft and connected to an actuator for driving the flight control surface, the aircraft reaction link including a link body formed of a fiber-reinforced plastic and a bush fixed on the link body, the method includes: a winding step to wind fibers around a core to form a part of the link body; a temporary bush fixation step to wind the fibers around the bush continuously; a resin impregnation step to impregnate the fibers with a resin; and a final bush fixation step to set the resin permeating the fibers to fix the bush on the link body.

With this arrangement, mounting of the bush on the link body can be facilitated. As a result, the aircraft reaction link having necessary strength and a reduced weight can be produced at low costs.

Weight reduction can be attained while ensuring necessary strength, with the supporting structure for a force transmission member, the aircraft reaction link, the flight control surface driving unit, the method of mounting a force transmission member, and the method of manufacturing aircraft reaction link according to the present invention.

BRIEF DESCRIPTION OF THE DRAWINGS

FIG. 5b is a plane view of FIG. 5a.

DESCRIPTION OF EXAMPLE EMBODIMENTS

Figure 1:
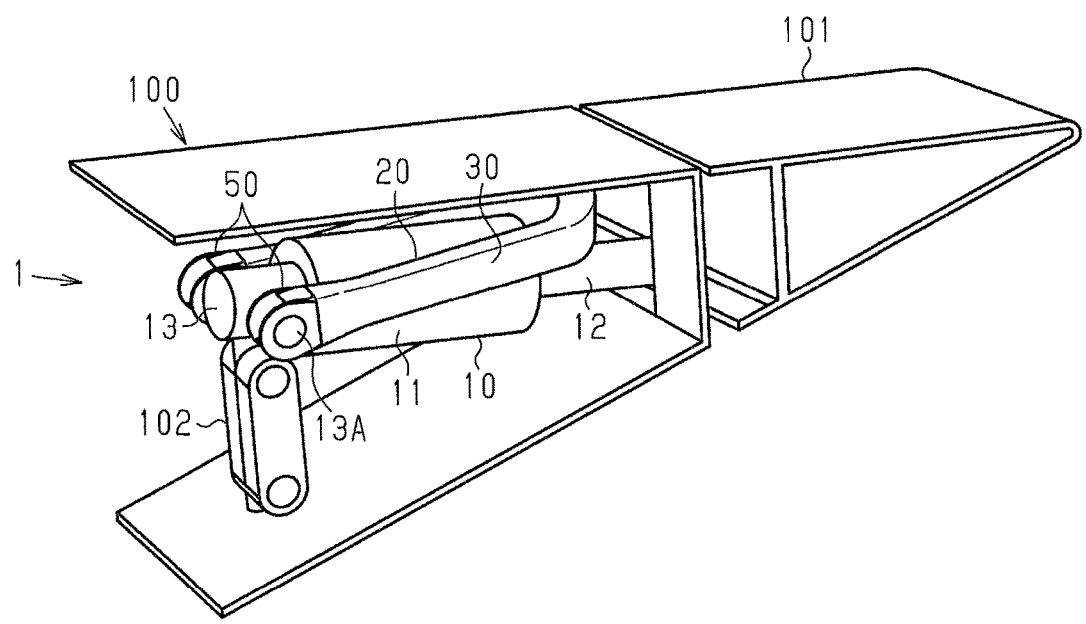
FIG. 1 is a perspective view of a part of a wing having a flight control surface driving unit of an embodiment installed thereon.

A flight control surface driving unit according to an embodiment will now be described with reference to the drawings. For convenience, FIG. 1 omits a part of the connection structure between the flight control surface driving unit and the flight control surface. As shown in FIG. 1, the flight control surface driving unit 1 may be provided to an aircraft so as to drive the flight control surface 101 of a wing 100 of the aircraft. The flight control surface 101 may be constituted by an aileron, a rudder, an elevator, or other control surfaces of aircrafts. The flight control surface driven by the flight control surface driving unit 1 may also be constituted by a flap or a spoiler.

The flight control surface driving unit 1 may include an actuator 10 for driving the flight control surface 101 and a reaction link 20 for withstanding a reaction force from the flight control surface 101 produced when the actuator 10 drives the flight control surface 101. The reaction link 20 may be an example of aircraft reaction links.

Figure 2:
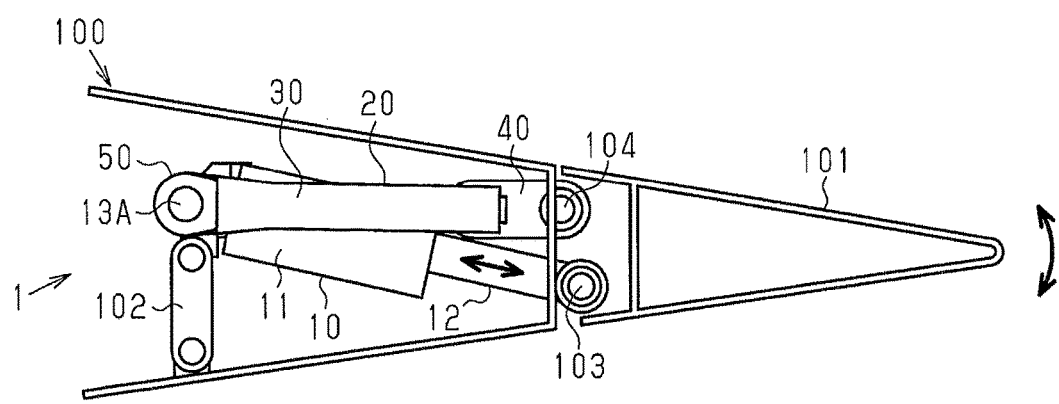
FIG. 2 is a side view of FIG. 1.

As shown in FIG. 2, the actuator 10 may be connected to a support 102 provided on the wing 100 and a connection shaft 103 of the flight control surface 101. The actuator 10 may rotate the flight control surface 101 around a fulcrum shaft 104 supporting the flight control surface 101 so as to be rotatable with respect to the wing 100. The actuator 10 may be a hydraulic linear actuator configured such that a hydraulic oil is supplied to and drained from a cylinder 11 so as to reciprocate a rod 12 in the axial direction thereof. The actuator 10 may also be an electromechanical linear actuator including an electric motor and a ball screw mechanism. An end of the rod 12 may be rotatably connected to the connection shaft 103. That is, the actuator 10 may be directly connected to the flight control surface 101. It may also be possible that the end of the rod 12 is connected to a horn arm (not shown) connected to the flight control surface 101. That is, the actuator 10 may also be indirectly connected to the flight control surface 101.

As shown in FIG. 1, the actuator 10 may include a connecting portion 13 connecting to the reaction link 20 and the support 102. The connecting portion 13 may be provided on a side of the cylinder 11 opposite to the side from which the rod 12 may be projected. The connecting portion 13 may include a shaft 13A extending orthogonally to the axis of the rod 12.

The reaction link 20 may be rotatably connected to the fulcrum shaft 104 and the shaft 13A of the connecting portion 13. When the actuator 10 drives the flight control surface 101, the reaction link 20 may restrain the load imparted on the movable flight control surface 101 from directly impacting the stationary wing 100.

The flight control surface driving unit 1 thus configured may operate as follows. A hydraulic power unit (not shown) for supplying a hydraulic oil to the actuator 10 may operate based on instructions from a flight controller (not shown), such that the hydraulic oil may be supplied to and drained from the cylinder 11 of the actuator 10. Thus, as shown in FIG. 2, the rod 12 may be projected from or retracted into the cylinder 11, and therefore, the flight control surface 101 connected to the rod 12 via the connection shaft 103 may be rotated around the fulcrum shaft 104. As the flight control surface 101 rotates, the reaction link 20 may swing around the fulcrum 104. Also, the reaction link 20, which may rotatably support the shaft 13A, may receive a reaction force from the flight control surface 101 when the actuator 10 drives the flight control surface 101.

Figure 3:
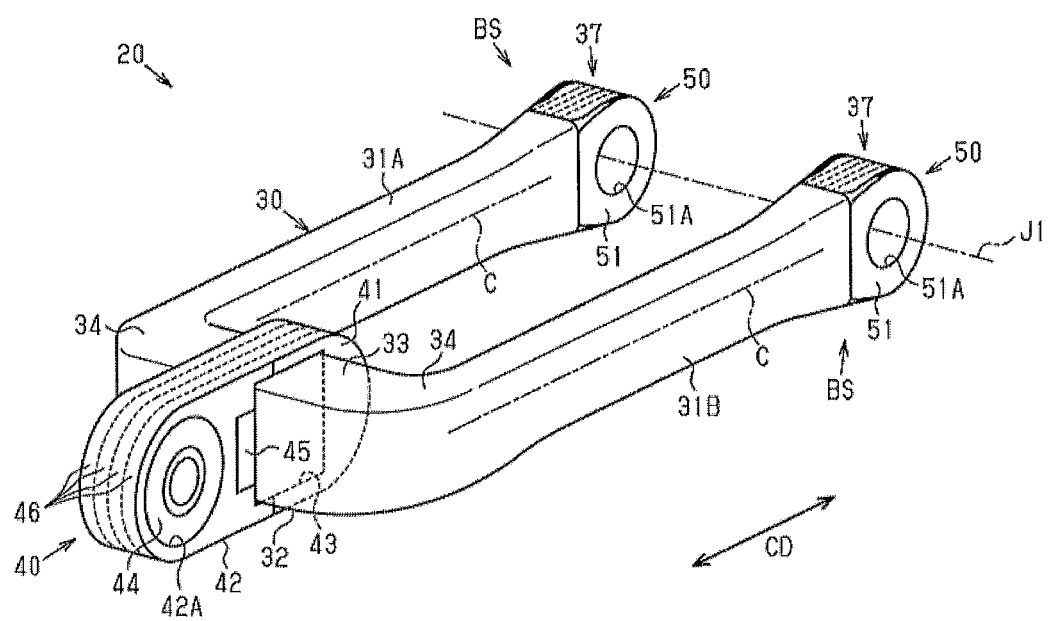
FIG. 3 is a perspective view of an aircraft reaction link shown in FIG. 1.

Next, the constitution of the reaction link 20 will now be described with reference to FIGS. 2 to 9. As shown in FIGS. 2 and 3, the reaction link 20 may include a link body 30 for connecting between the fulcrum shaft 104 and the shaft 13A of the actuator 10, a head 40 positioned on an end portion of the link body 30 on the fulcrum shaft 104 side and connected to the fulcrum shaft 104, and a pair of bushes 50 fixed on the link body 30 and slidably supporting the shaft 13A. Thus, the pair of bushes 50 may slidably support the actuator 10. The bushes 50 may correspond to force transmission members for receiving a force from the actuator 10.

The link body 30 may be substantially U-shaped in a plane view. The link body 30 may include a pair of legs 31A, 31B extending straight along the longitudinal axis C indicating the longitudinal direction of the link body 30 and arranged in parallel with each other at a distance. Each of the legs 31A, 31B may have a substantially rectangular section. The legs 31A, 31B may be connected to each other at one end side thereof via a connecting portion 32. The connecting portion 32 may include a straight portion 33 and bent portions 34 provided on both ends of the straight portion 33. The straight portion 33 may extend in a direction orthogonal to the longitudinal axis C. The pair of legs 31A, 31B and the connecting portion 32 may be integrated together. The link body 30 may be straight or J-shaped, instead of being substantially U-shaped. If the link body 30 is straight or J-shaped, one or two bushes 50 may be connected to the link body 30. If the link body 30 is straight or J-shaped and is connected to two bushes 50, these two bushes 50 may be connected to both longitudinal ends of the ling body 30.

The link body 30 may be made of a fiber-reinforced plastic (FRP). More preferably, the link body 30 may be made of a carbon fiber-reinforced plastic (CFRP). Usable carbon fibers may include PAN-based carbon fibers and pitch-based carbon fibers. It may also be possible that the link body 30 is formed of, e.g., a glass fiber-reinforced plastic (GFRP), a glass-mat reinforced thermoplastic (GMT), a boron fiber-reinforced plastic (BFRP), an aramid fiber-reinforced plastic (AFRP, KFRP), a Dyneema fiber-reinforced plastic (DFRP), a Xyron-reinforced plastic (ZFRP), etc. It may also be possible that the link body 30 includes a fiber-reinforced plastic in only the pair of legs 31A, 31B and the connecting portion 32 is formed of a material other than fiber-reinforced plastics such as a metal material. It may also be possible that the link body 30 includes a fiber-reinforced plastic in only a part of the end portions of the pair of legs 31A, 31B. Further, it may also be possible to use a fiber-reinforced plastic including a plurality of types of fibers combined together or to use a plurality of types of fiber-reinforced plastics combined together.

The head 40 may be connected to the middle of the straight portion 33 of the connecting portion 32. The head 40 may be constituted by a first head body 41 and a second head body 42. The first head body 41 and the second head body 42, both being substantially U-shaped, may be fastened together to form a mounting hole 43 in which to nip the connecting portion 32. The first head body 41 may extend from the connecting portion 32 toward the ends of the pair of legs 31A, 31B. The second head body 42 may extend from the connecting portion 32 in the direction opposite to the ends of the pair of legs 31A, 31B. The second head body 42 may have a bearing hole 42A extending therethrough in the direction in which the connecting portion 32 extends. The bearing hole 42A may have a bearing 44 fitted therein. One example of the bearing 44 may be a ball bearing. The fulcrum 104 (see FIG. 2) may be fitted in the bearing 44. Thus, the head 40 may be rotatably connected to the fulcrum 104. A gap is formed between the mounting hole 43 and the connecting portion 32. A wedge 45 may be press-fitted in the gap.

A fiber 46 may be wound on the outer peripheral surface of the first head body 41 and the second head body 42. The fiber 46 may be constituted by either one fiber or a plurality of fibers. This fiber may fasten the first head body 41 and the second head body 42 together.

The bushes 50 may be connected to the end portion of the leg 31A and the end portion of the leg 31B. Thus, the bushes 50 may be supported by the link body 30. The structure in which the link body 30 supports the bushes 50 may be hereinafter referred to as a bush supporting structure BS. The link body 30 may correspond to a structural member supporting the bushes 50. If the link body 30 includes a fiber-reinforced plastic in only the legs 31A, 31B, the legs 31A, 31B may correspond to the structural members. If the link body 30 includes a fiber-reinforced plastic in only a part of the end portions of the legs 31A, 31B, the part of the end portions of the legs 31A, 31B formed of the fiber-reinforced plastic may correspond to the structural members. Further, the bush supporting structure BS may correspond to a supporting structure for the force transmission members.

Figure 4:
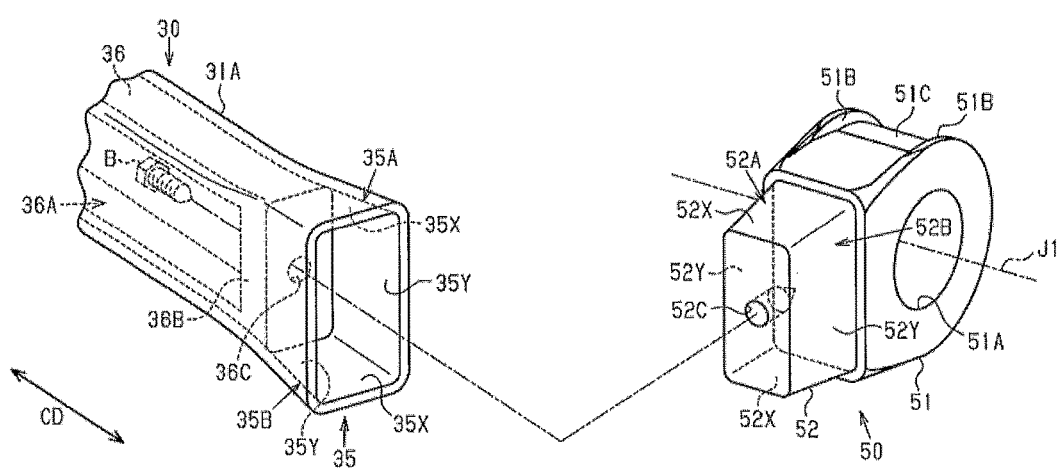
FIG. 4 is an exploded perspective view of an opening portion in a link body and a bush of the aircraft reaction link.
Figure 5A:
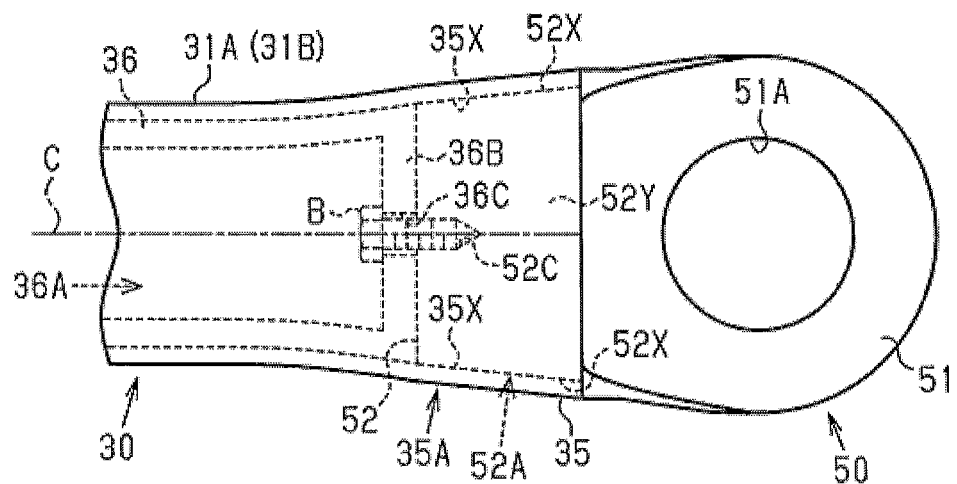
FIG. 5a is a side view of a part of the link body and the bush.
Figure 5B:
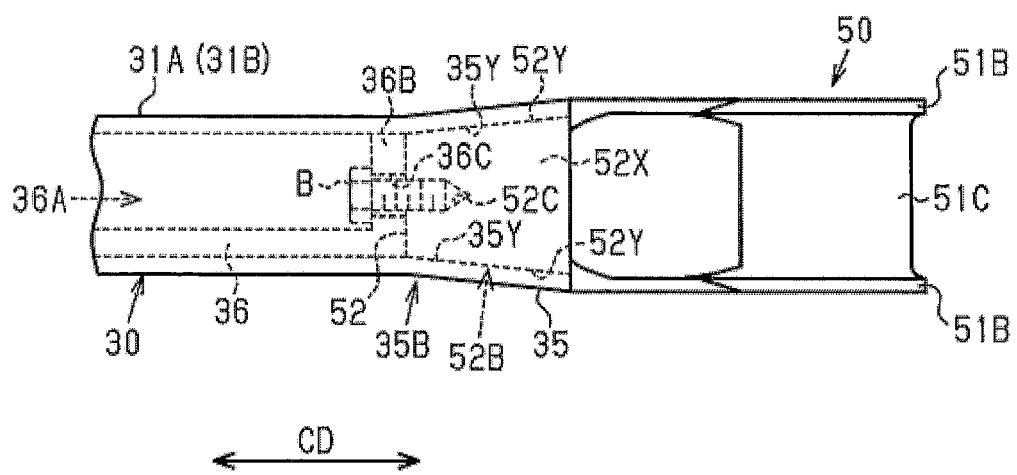

FIG. 4 shows an exploded view of the end portion of the leg 31A and the bush 50 connected to the leg 31A, and FIGS. 5a and 5b show that the bush 50 is connected to the end portion of the leg 31A. In FIG. 4 and FIGS. 5a and 5b, a part of the bush supporting structure BS is omitted. The end of portion the leg 31B and the bush 50 connected to the leg 31B may also be configured as shown in FIG. 4 and FIGS. 5a and 5b.

As shown in FIG. 4, the bush 50 may include a bush body 51 slidably supporting the shaft 13A of the actuator 10 (see FIG. 2 for both) and an insertion projection 52 inserted into an opening portion 35 formed in the end portion of the leg 31A. The insertion projection 52 may correspond to a projection.

The bush body 51 may have a through-hole 51A extending therethrough in the axial direction of the shaft 13A (hereinafter referred to as the "axial direction J1"). The shaft 13A may be inserted through the through-hole 51A. On the opposite ends of the outer periphery of the bush body 51 opposed to each other in the axial direction J1, arc-shaped ribs 51B may be formed integrally with the bush body 51. The ribs 51B may extend radially outward from the outer peripheral surface 51C of the bush body 51. Each of the ribs 51B may also be constituted by a plurality of circumferentially short and arc-shaped projections arranged at intervals in the circumferential direction of the outer periphery of the bush body 51. The ribs 51B may also be formed separately from the bush body 51. It may also be possible that the ribs 51B are omitted.

The insertion projection 52 may extend toward the link body 30 (the leg 31A). As shown in FIG. 4, the insertion projection 52 may have a tapered rectangular shape constituted by a pair of planar surfaces 52X and a pair of side surfaces 52Y. More specifically, the pair of planar surfaces 52X may be sloped similarly to converge toward the end of the insertion projection 52 so as to constitute a taper 52A. Thus, the shape of the taper 52A may be symmetric. The pair of side surfaces 52Y may be sloped similarly to converge toward the end of the insertion projection 52 so as to constitute a taper 52B. Thus, the shape of the taper 52B may be symmetric. The tapers 52A, 52B having symmetric shapes can receive a load in a good balance. In the end of the insertion projection 52, a screw hole 52C may extend in the longitudinal direction CD. Either one of the taper 52A and the taper 52B may be omitted. Further, the planar surfaces 52X may not necessarily be arranged symmetrically, and likewise the side surfaces 52Y may not necessarily be arranged symmetrically. Each pair of the planar surfaces 52X and the side surfaces 52Y may be required only to be tapered.

As shown in FIG. 4, among the inner surfaces of the opening portion 35 of the leg 31A, a pair of inner surfaces 35X facing the planar surfaces 52X may be sloped similarly to diverge toward the end of the opening portion 35 so as to constitute a taper 35A. Thus, the shape of the taper 35A may be symmetric. Among the inner surfaces of the opening portion 35, a pair of inner surfaces 35Y facing the side surfaces 52Y may be sloped similarly to diverge toward the end of the opening portion 35 so as to constitute a taper 35B. Thus, the shape of the taper 52B may be symmetric. Therefore, the opening area of the opening portion 35 may be larger toward the end of the leg 31A (the opening portion 35). Either one of the taper 35A and the taper 35B may be omitted. Further, the inner surfaces 35X may not necessarily be arranged symmetrically, and likewise the inner surfaces 35Y may not necessarily be arranged symmetrically. Each pair of the inner surfaces 35X and the inner surfaces 35Y may be required only to be tapered.

As shown in FIG. 5a, the pair of planar surfaces 52X may be parallel with the pair of inner surfaces 35X. Thus, when the insertion projection 52 is inserted into the opening portion 35, the pair of inner surfaces 35X and the pair of planar surfaces 52X may be in surface contact with each other. As shown in FIG. 5b, the pair of side surfaces 52Y may be parallel with the pair of inner surfaces 35Y. Thus, when the insertion projection 52 is inserted into the opening portion 35, the pair of inner surfaces 35Y and the pair of side surfaces 52Y may be in surface contact with each other.

With such an arrangement, the contact area between the planar surfaces 52X and the inner surfaces 35X and the contact area between the side surfaces 52Y and the inner surfaces 35Y may be large enough to relieve stress concentration, eliminating the need of excessively large thickness. Therefore, reduction of the weight can be achieved while ensuring the necessary strength of the bush supporting structure BS.

The leg 31A and the bush supporting structure BS will now be described in detail with reference to FIGS. 4 to 9. Since the leg 31B has the same configuration, the description thereof will be omitted, FIGS. 6 to 9 show a part of the leg 31A.

Figure 6:
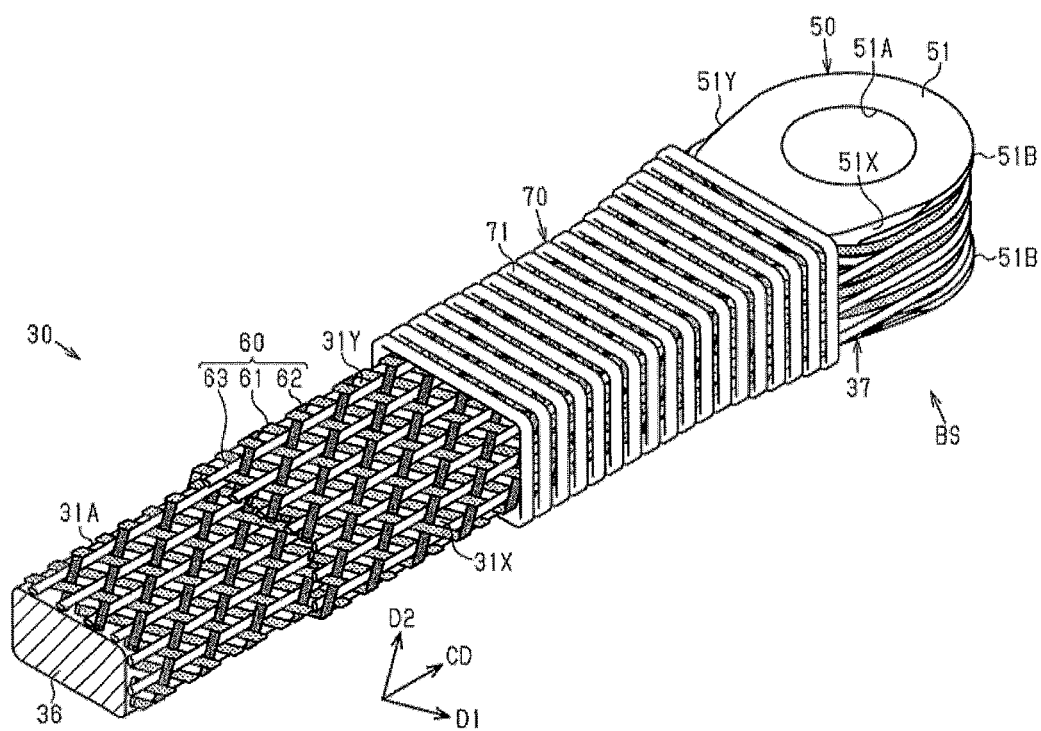
FIG. 6 is a perspective view of a part of the link body and the bush.

As shown in FIG. 6, the link body 30 may include a core 36 having a rectangular section, a plurality of fibers 60 wound around the core 36, and a reinforcement member 70 covering a part of the leg 31A. The core 36 may be formed of, e.g., a foamed plastic heat insulating material, and more preferably, formed of an extruded foamed polystyrene heat insulating material. The shape of the core 36 may be similar to that of the link body 30. As shown in FIGS. 4 and 5, the core 36 may have a recess 36A extending in the direction along the longitudinal axis C of the leg 31A (see FIG. 3) (hereinafter the "longitudinal direction CD"). The end wall 36B of the recess 36A may have a through-hole 36C extending therethrough in the longitudinal direction CD. A bolt B may be inserted into the through-hole 36C in the end wall 36B of the core 36. The bolt B may be screwed into the screw hole 52C in the insertion projection 52 of the bush 50. Thus, the core 36 and the bush 50 may be connected. This connection may also be achieved by other methods such as adhesion as long as the core 36 and the bush 50 remain connected during manufacturing. The core 36 may also have any sectional shape other than a rectangle such as a circle. Further, the core 36 may also be formed of any material other than a foamed plastic heat insulating material such as resin materials or metal materials.

As shown in FIG. 6, the fibers 60 may include first fibers 61, second fibers 62, and third fibers 63. Each of the first fibers 61, the second fibers 62, and the third fibers 63 may be a tow made of the same material and constituted by a bundle of fiber bundles (filaments) including a large number of monofilaments. In addition, it may also be possible that each of the first fibers 61, the second fibers 62, and the third fibers 63 is a monofilament, a filament, a staple yarn produced by staple spinning, or a braid or a knitted cord including tows. Further, it may also be possible that each of the first fibers 61, the second fibers 62, and the third fibers 63 is made of a different material. The reinforcement member 70 may reinforce the fixation between the link body 30 and the bush 50.

Figure 7:
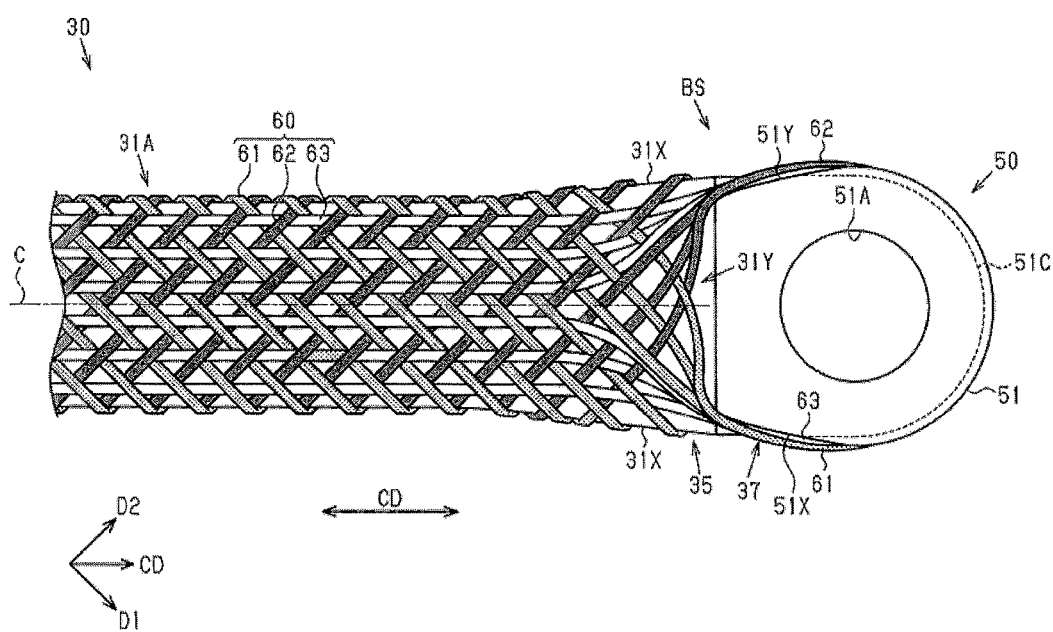
FIG. 7 is a side view of the link body of FIG. 6 omitting a reinforcement member.

FIG. 7 omits the reinforcement member 70 from the link body 30 shown in FIG. 6 for convenience. As shown in FIG. 7, the first fibers 61 may extend in a first direction D1 different from the longitudinal direction CD. The second fibers 62 may extend in a second direction D2 different from the longitudinal direction CD and the first direction D1. The third fibers 63 may extend in the longitudinal direction CD. The first fibers 61, the second fibers 62, and the third fibers 63 may be woven together and wound around the core 36 (see FIG. 6). The first direction D1 may form an acute angle of 45° with the longitudinal direction CD, and the second direction D2 may form an acute angle of 45° with the longitudinal direction CD toward the opposite direction than the first direction D1. Therefore, the first fibers 61 and the second fibers 62 may be orthogonal to each other. The leg 31A may include a plurality of layers each constituted by fibers 61 to 63 woven together (two layers in this embodiment). The acute angle formed by the first direction D1 with the longitudinal direction CD may be different from 45°, and may be 30° for example. The acute angle formed by the second direction D2 with the longitudinal direction CD may be different from 45°, and may be 30° for example. Therefore, it may also be possible that the first direction D1 and the second direction D2 are not orthogonal to each other. Further, it may also be possible that the acute angle formed by the first direction D1 with the longitudinal direction CD and the acute angle formed by the second direction D2 with the longitudinal direction CD may not necessarily be the same. For example, it may be possible that one is 15° and the other is 30°. As these acute angles are smaller, the strength to withstand a tensile force in the longitudinal direction CD is larger, but the strength to withstand a force to expand the fibers in the direction orthogonal to the longitudinal direction CD is smaller. Therefore, the acute angles should be set appropriately in accordance with the actual loads. It may also be possible that the fibers 61 to 63 are not woven together but form respective layers stacked together in the order of the first fibers 61, the second fibers 62, and the third fibers 63, for example. In this case, the first fibers 61 may be first wound around the core 36, then the second fibers 62 may be wound around the core 36 so as to be stacked on the first fibers 61, and then the third fibers 63 may be wound around the core 36 so as to be stacked on the second fibers 62. The order of stacking the first fibers 61, the second fibers 62, and the third fibers 63 may be changed desirably.

The bush supporting structure BS may include a supporting portion 37 in which the fibers 61 to 63 extending from the opening portion 35 of the leg 31A may encircle the bush 50 thereby to support the bush 50. The fibers 61 to 63 included in the supporting portion 37 may be continuous. The fibers 61 to 63 included in the supporting portion 37 may be wound around the bush 50 as follows. In this embodiment, the fibers 61 to 63 extending from the opening portion 35 of the leg 31A may be wound around the outer peripheral surface 51C of the bush body 51, as an example arrangement around the bush 50.

Among the first fibers 61 included in the supporting portion 37, those extending from the opening portion 35 in one of the side surfaces 31Y of the leg 31A may extend toward one side surface 51X of the bush body 51 on the same side as one of the planar surfaces 31X of the leg 31A. These first fibers 61 on the one side surface 51X may extend around the outer peripheral surface 51C of the bush body 51 and further extend via the other side surface 51Y of the bush body 51 toward the proximal side of the other of the planar surfaces 31X of the leg 31A.

Among the second fibers 62 included in the supporting portion 37, those extending from the opening portion 35 in the one of the side surfaces 31Y of the leg 31A may extend toward the other side surface 51Y of the bush body 51. These second fibers 62 on the other side surface 51Y may extend around the outer peripheral surface 51C of the bush body 51 and further extend via the one side surface 51X toward the proximal side of the other of the planar surfaces 31X of the leg 31A. That is, the direction in which the first fibers 61 extending from the one of the side surfaces 31Y of the leg 31A are wound around the outer peripheral surface 51C of the bush body 51 may be opposite to the direction in which the second fibers 62 extending from the one of the side surfaces 31Y of the leg 31A are wound around the outer peripheral surface 51C of the bush body 51.

Although not shown in FIG. 7, among the first fibers 61 included in the supporting portion 37, those extending from the opening portion 35 in the other of the side surfaces 31Y of the leg 31A (on the back of the drawing) may extend toward the other side surface 51Y of the bush body 51. These first fibers 61 on the other side surface 51Y may extend around the outer peripheral surface 51C of the bush body 51 and further extend via the one side surface 51X of the bush body 51 toward the proximal side of the one of the planar surfaces 31X of the leg 31A. Among the second fibers 62 included in the supporting portion 37, those extending from the opening portion 35 in the other of the side surfaces 31Y of the leg 31A may extend toward the one side surface 51X of the bush body 51. These second fibers 62 on the one side surface 51X may extend around the outer peripheral surface 51C of the bush body 51 and further extend via the other side surface 51Y toward the proximal side of the one of the planar surfaces 31X of the leg 31A. Thus, the direction in which the first fibers 61 extending from the other of the side surfaces 31Y of the leg 31A are wound around the bush body 51 may be opposite to the direction in which the second fibers 62 extending from the other of the side surfaces 31Y of the leg 31A are wound around the bush body 51. Therefore, as compared to the case where these fibers are wound in the same direction, the fibers may be prevented from being bent excessively, and the fibers may be arranged in a good balance in the direction orthogonal to the longitudinal direction CD. Thus, the bush supporting structure BS as a whole can withstand the tensile force in a good balance. Additionally, the amount of the fiber extending toward the side surface 51Y may be different from the amount of the fiber extending toward the side surface 51X, depending on the load conditions.

Thus, the direction in which the first fibers 61 extending from the one of the side surfaces 31Y of the leg 31A are wound around the bush body 51 may be opposite to the direction in which the first fibers 61 extending from the other of the side surfaces 31Y of the leg 31A are wound around the bush body 51. Likewise, the direction in which the second fibers 62 extending from the one of the side surfaces 31Y of the leg 31A are wound around the bush body 51 may be opposite to the direction in which the second fibers 62 extending from the other of the side surfaces 31Y of the leg 31A are wound around the bush body 51. Therefore, as compared to the case where these fibers are wound in the same direction, the fibers may be prevented from being bent excessively, and the fibers may be arranged in a good balance in the direction orthogonal to the longitudinal direction CD. Thus, the bush supporting structure BS as a whole can withstand the tensile force in a good balance. Additionally, the amount of the fiber extending toward the side surface 51Y may be different from the amount of the fiber extending toward the side surface 51X, depending on the load conditions.

Among the third fibers 63 included in the supporting portion 37, those included in both of the side surfaces 31Y of the leg 31A at the opening portion 35 may diverge in two directions toward the side surfaces 51X, 51Y of the bush body 51, extend around the outer peripheral surface 51C of the bush body 51, and further extend toward the proximal side of the both of the planar surfaces 31X of the leg 31A. Among the third fibers 63 included in the supporting portion 37, those included in the one of the side surfaces 31X of the opening portion 35 may extend along the longitudinal direction CD, extend around the outer peripheral surface 51C of the bush body 51, and further extend toward the proximal side of the other of the planar surfaces 31X. On the other hand, among the third fibers 63 included in the supporting portion 37, those included in the other of the side surfaces 31X of the opening portion 35 may extend along the longitudinal direction CD, extend around the outer peripheral surface 51C of the bush body 51, and further extend toward the proximal side of the one of the planar surfaces 31X. Thus, the third fibers 63 may include fibers wound around the outer peripheral surface 51C of the bush body 51 in a first winding direction (such as indicated by the arrow Y1 in FIG. 8a) and fibers wound in a second winding direction (such as indicated by the arrow Y2 in FIG. 8b) opposite to the first winding direction. Therefore, as compared to the case where these fibers are wound in the same direction, the fibers may be prevented from being bent excessively, and the fibers may be arranged in a good balance in the direction orthogonal to the longitudinal direction CD. Thus, the bush supporting structure BS as a whole can withstand the tensile force in a good balance. Additionally, the amount of the fiber wound in the first winding direction may be different from the amount of the fiber wound in the second direction, depending on the load conditions. The fibers 61 to 63 included in the supporting portion 37 may extend around the bush 50 and further to the proximal side of the leg 31A. Such end portions of these fibers may also be referred to as "terminal end portions."

Figure 8A:
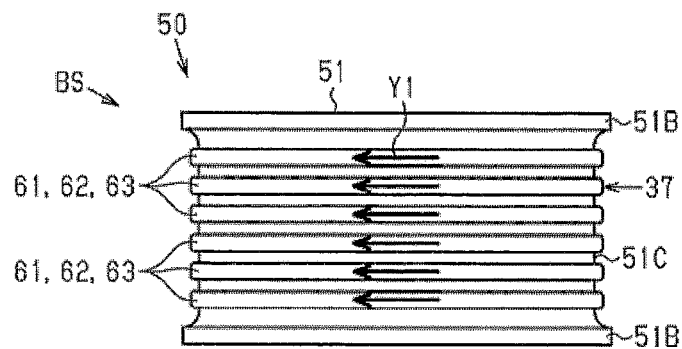
FIG. 8a is a side view of the bush.
Figure 8B:
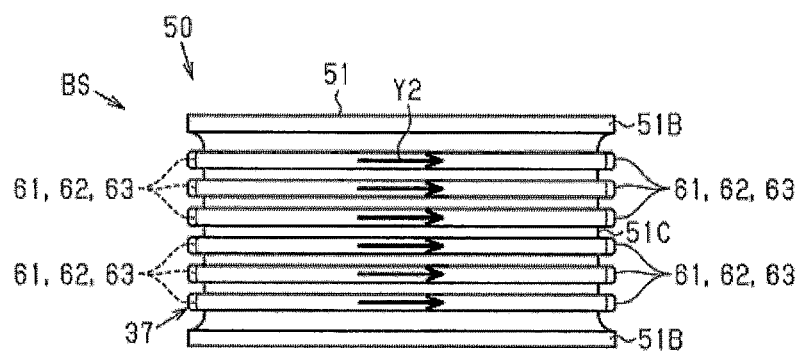
FIG. 8b is a side view of the bush.

As shown in FIG. 8a, the fibers 61 to 63 included in the supporting portion 37 may be wound around the outer peripheral surface 51C of the bush body 51 in the direction of the arrow Y1, and then, as shown in FIG. 8b, these fibers may be wound around the outer peripheral surface of the bush body 51 in the direction of the arrow Y2 opposite to the direction of the arrow Y1. Thus, the fibers 61 to 63 included in the supporting portion 37 may be wound around the outer peripheral surface 51C of the bush body 51 so as to form layers stacked together.

Figure 8C:
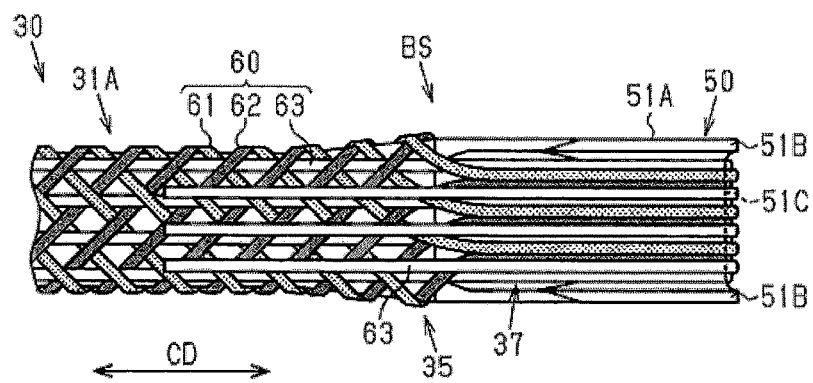
FIG. 8c is a plane view of a part of the link body and the bush.

As shown in FIG. 8c, the terminal end portions of the fibers 61 to 63 included in the supporting portion 37 and wound around the bush 50 may be positioned on the outer side of the fibers 61 to 63 constituting the opening portion 35. FIG. 8c shows that only the terminal end portions of the third fibers 63 included in the supporting portion 37 may extend in the longitudinal direction CD, but the terminal end portions of the first fibers 61 and the terminal end portions of the second fibers 62 included in the supporting portion 37 may also extend in the longitudinal direction CD in the same manner.

As shown in FIG. 6, the reinforcement member 70 may be provided externally on the terminal end portions of the fibers 61 to 63. Thus, the reinforcement member 70 may reinforce the fixation of the bush 50 by the supporting portion 37. The reinforcement member 70 may include a fiber 71 which is the same as the fibers 60. The fiber 71 may be wound in a plurality of turns around the leg 31A in the direction orthogonal to the longitudinal direction CD. The fiber 71 may be wound around the leg 31A regularly. The fiber 71 may also include different substances or have different configuration than the fibers 60.

Figure 9:
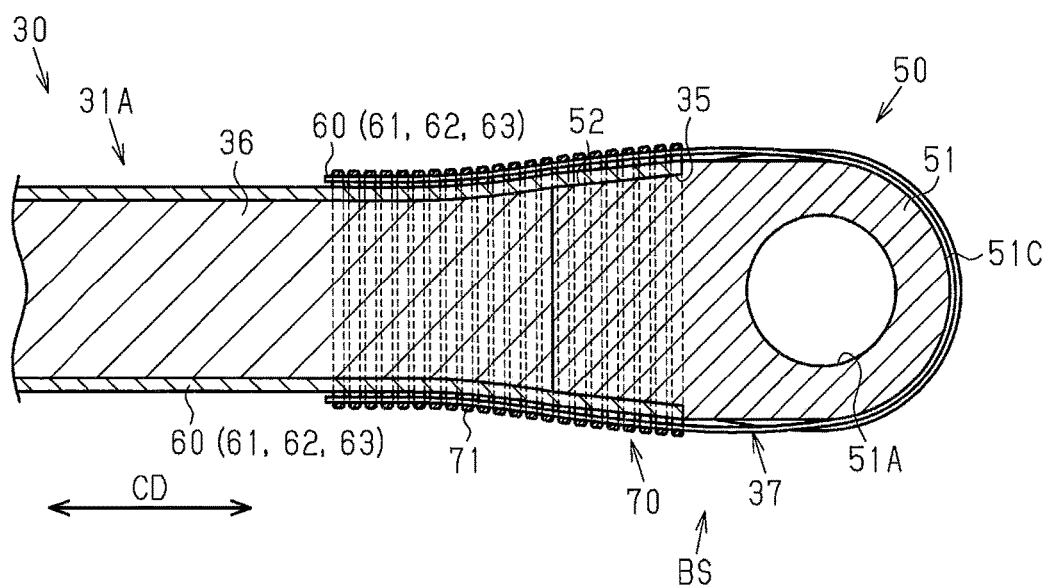
FIG. 9 is a schematic sectional view of a part of the link body and the bush.

As shown in FIGS. 6 and 9, the fiber 71 may be wound around the leg 31A over the region extending in the longitudinal direction CD from the portion of the link body 30 in which the opening portion 35 overlaps the insertion projection 52 of the bush 50 to the tip ends of the terminal end portions of the fibers 61 to 63. The fiber 71 may be wound around the leg 31A to form an outermost layer on the fibers 61 to 63 included in the supporting portion 37. Thus, the reinforcement member 70 may fix the end portion of the supporting portion 37. This arrangement may reduce the possibility of removal of the fibers 61 to 63 at the tip ends of the terminal end portions thereof, thereby to ensure the necessary strength and reduce the weight.

Figure 10:
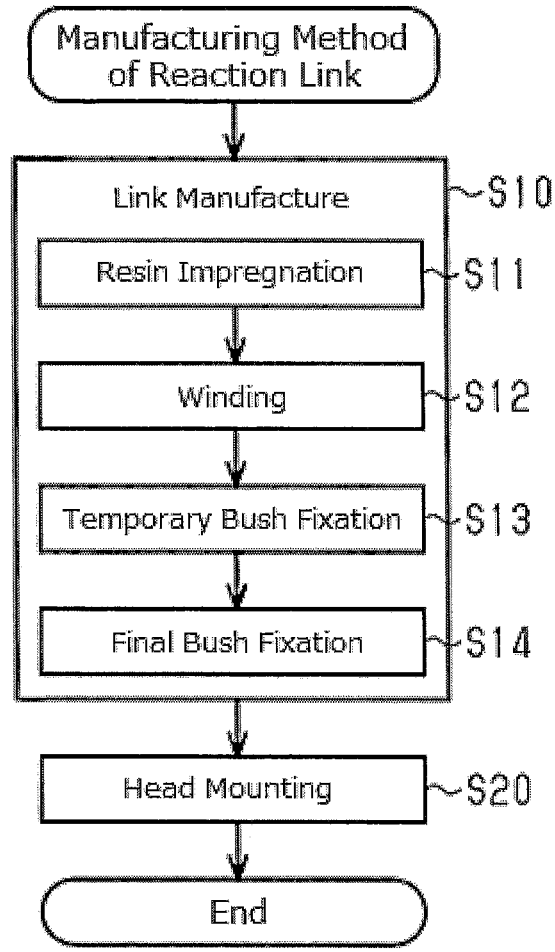
FIG. 10 is a flowchart showing a method of manufacturing an aircraft reaction link.

A method of manufacturing the reaction link 20 described above will now be described with reference to FIG. 10. In particular, a method of fixing the bush 50 on the link body 30 will be described in detail. In the following description with reference to FIG. 10, the elements of the reaction link 20 accompanied by a reference number refer to the elements of the reaction link shown in FIGS. 3 to 9.

This manufacturing method may include a link manufacturing step (step S10) and a head mounting step (step S20). The link manufacturing step may in turn include a resin impregnation step (step S11), a winding step (step S12), a temporary bush fixation step (step S13), and a final bush fixation step (step S14). Additionally, the resin impregnation step, the winding step, the temporary bush fixation step, and the final bush fixation step may correspond respectively to a resin impregnation step, a winding step, a temporary fixation step, and a final fixation step in a method of fixing a force transmission member.

First, in the resin impregnation step, an impregnation fluid tank containing a thermosetting resin (e.g., unsaturated polyester) as an impregnation fluid may be prepared. Then, the fibers 61 to 63 extending from a winding machine (not shown) may be soaked into the impregnation fluid tank, the winding machine being used for winding the fibers 61 to 63 around the core 36. In the resin impregnation step, the unsaturated polyester may be replaced with, e.g., an epoxy resin, a polyamide resin, or a phenol resin. Further, the thermosetting resin may be replaced with, e.g., a UV-curable resin, a light curable resin, a thermoplastic resin (e.g., methyl methacrylate).

Next, in the winding step, a unit including the core 36 and the bushes 50 previously connected together via the bolts B may be prepared. Then, the fibers 61 to 63 impregnated with the thermosetting resin in the resin impregnation step may be woven together and wound around the unit by the winding machine. For example, the fibers 61 to 63 may be wound around the core 36 and the insertion projections 52 of the bushes 50 from the opening portion 35 of the leg 31A toward the opening portion 35 of the leg 31B. Further, the fibers 61 to 63 may be woven and wound around the core 36 and the insertion projections 52 to form two layers. The fibers 61 to 63 included in the supporting portion 37 may extend from the opening portion 35 of the leg 31A or the opening portion 35 of the leg 31B. That is, in the winding step, the portion of the link body 30 other than the supporting portion 37 may be formed.

Next, in the temporary bush fixation step, the fibers 61 to 63 extending from the opening portion 35 of the leg 31A or the opening portion 35 of the leg 31B may be wound around the outer peripheral surface 51C of the bush body 51 so as to encircle the bush 50 in the circumferential direction of the bush 50. More specifically, as shown in FIGS. 8a and 8b, the fibers 61 to 63 extending from the opening portion 35 of the leg 31A may be wound in turn to form layers stacked together in the radial direction of the bush 50. Therefore, all of the fibers 61 to 63 included in the supporting portion 37 may be wound around the bush 50. The terminal end portions of the fibers 61 to 63 may extend along the planar surfaces 31X of the opening portion 35 of the leg 31A toward the proximal side of the leg 31A. Likewise, the fibers 61 to 63 extending from the opening portion 35 of the leg 31B may be wound around the outer peripheral surface 51C of the bush body 51 and extend along the planar surfaces 31X of the leg 31B toward the proximal side of the link body 30. The supporting portion 37 may be thus formed.

Then, the fiber 71 of the reinforcement member 70 may be wound by the winding machine externally around the region from an opening end of the opening portion 35 of the leg 31A to the tip ends of the terminal end portions of the fibers 61 to 63. The fiber 71 extending from the winding machine may be soaked into the impregnation fluid tank and then wound around the link body 30. The fiber 71 may also be wound around the leg 31B in the same manner. In this embodiment, the fibers 60 and the fiber 71 may include the same substances and have the same configuration, and therefore, the reinforcement member 70 can be manufactured by the same manufacturing machine as the link body 30.

Next, in the final bush fixation step, the link body manufactured in the temporary bush fixation step may be heated. Thus, the resin permeating the fibers 61 to 63 may set and the link body 30 may be complete. If the thermosetting resin is replaced with, e.g., a UV-curable resin in the resin impregnation step, the link body may be irradiated with ultraviolet rays in the final bush fixation step to set the resin permeating the fibers 61 to 63.

It may also be possible that the fibers 61 to 63 are wound around the core 36 and the fiber 71 is wound around the legs 31A, 31B in the winding step and the temporary bush fixation step, before the fibers 61 to 63 and 71 are soaked into the impregnation fluid tank in the resin impregnation step. Further, it may also be possible that in the resin impregnation step, the fibers 61 to 63 are sprayed with a thermosetting resin, a UV-curable resin, a light curable resin, or a thermoplastic resin, instead of being soaked into the fluid tank. Still further, the unit including the core 36 and the bushes 50 connected via the bolts B may be prepared prior to the resin impregnation step.

Finally, in the head mounting step, the head 40 may be mounted on the link body 30. More specifically, as shown in FIG. 3, the first head body 41 and the second head body 42 may be fastened together on the straight portion 33 of the link body 30. The wedge 45 may be press-fitted into the mounting hole 43 formed between the head bodies 41, 42 fastened together, and the fibers 46 may be wound around the outer periphery of the head bodies 41, 42.

Figure 11A:
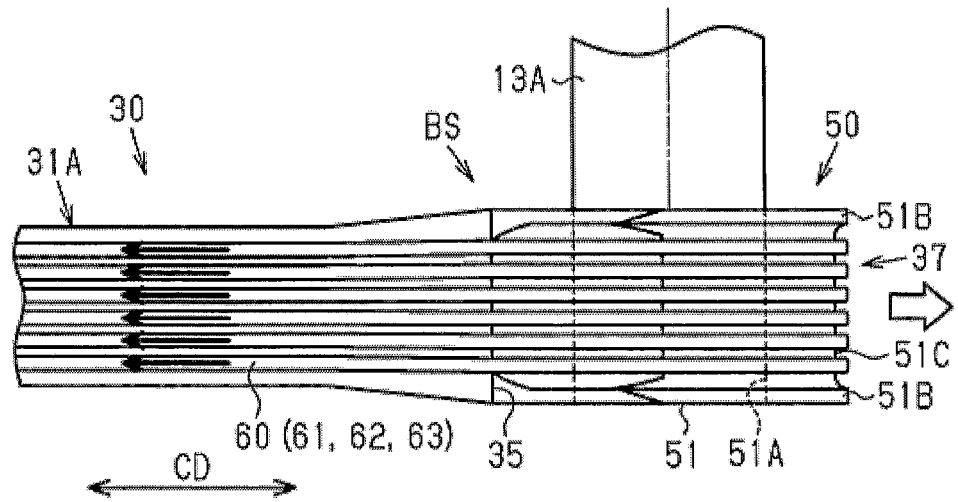
FIG. 11a is a schematic bottom view of a part of the link body.
Figure 11B:
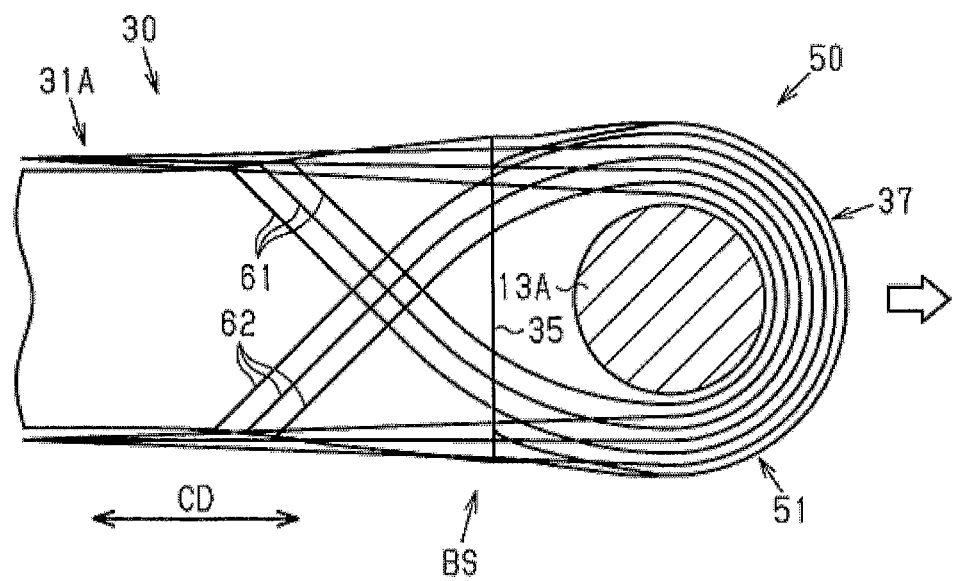
FIG. 11b is a schematic side view of a part of the link body.

The action of the reaction link 20 will now be described with reference to FIGS. 2 and 11. The action of the reaction link 20 in the leg 31B, which may be the same as that in the leg 31A, will be omitted. FIGS. 11a to 11c simplifies the fibers 61 to 63 for convenience in description. FIG. 11a shows only the third fibers 63, and FIG. 11b shows only the first fibers 61 and the second fibers 62.

As shown in FIG. 2, when a reaction force produced when the actuator 10 drives the flight control surface 101 is imparted to the actuator 10, the bush 50 may be subjected to a tensile load, a compressive load, or a torsional load via the shaft 13A connecting between the actuator 10 and the reaction link 20. The tensile load imparted to the bush 50 may be in a direction in which the bush 50 may be separated from the end portion of the leg 31A, as indicated by the white arrows in FIGS. 11a and 11b. The compressive load imparted to the bush 50 may be in a direction in which the bush 50 may be pressed toward the leg 31A, as indicated by the white arrow in FIG. 11c. The torsional load imparted to the bush 50 may twist around the shaft 13A as indicated by the shaded arrow in FIG. 11c due to the friction force between the shaft 13A and the bush 50, etc. or may twist around the longitudinal direction CD.

As shown in FIG. 11b, the first fibers 61 and the second fibers 62 included in the supporting portion 37 may be wound around the bush body 51 continuously from the opening portion 35 of the leg 31A. That is, the first fibers 61 and the second fibers 62 included in the supporting portion 37 may be continuous. Therefore, as indicated by the white arrows in FIGS. 11a and 11b, when a tensile load is imparted to the bush 50, the force imparted to the first fibers 61 and the second fibers 62 included in the supporting portion 37 and wound around the bush body 51 may be received by all of the first fibers 61 and the second fibers 62 included in the leg 31A. The same applies to the third fibers 63, which are not shown in FIG. 11b. Thus, the leg 31A can support the bush 50. In supporting the bush 50, the bush 50 may be retained such that the fibers 61 to 63 can produce a force against the direction of the force imparted to the fibers 61 to 63 in the leg 31A via the bush 50. The direction of the force imparted to the fibers 61 to 63 may correspond to the direction of the vector that is an aggregate of the direction vectors of the fibers 61 to 63 subjected to the force.

More specifically, as indicated by the white arrow in FIG. 11a, when a tensile force is imparted to the bush 50, that is, when the fibers 61 to 63 included in the supporting portion 37 and wound around the bush body 51 are dragged in the direction of the white arrow, the terminal end portions of the fibers 61 to 63 may be subjected to a tensile force in the direction of the fibers 61 to 63 (the longitudinal direction). Therefore, a reaction force against the tensile force may act on the fibers 61 to 63 in the direction of the thick arrows. In addition, the fibers 61 to 63 included in the supporting portion 37 may extend from the proximal side of the link body 30 prior to being wound around the bush body 51. Such end portions (hereinafter referred to as "initial end portions") may extend in the longitudinal direction CD, as the terminal end portions of the fibers 61 to 63. Thus, a reaction force may likewise act on the fibers 61 to 63 in the direction indicated by the thick arrows. In particular, the third fibers 63, which may extend along the longitudinal direction CD in the planar surfaces of the link body 30 and may be wound around the outer peripheral surface 51C of the bush body 51, may tend to be efficiently subjected to the tensile load in the direction in which the third fibers 63 may extend. Accordingly, the third fibers 63 can efficiently and firmly support the bush 50.

Figure 11C:
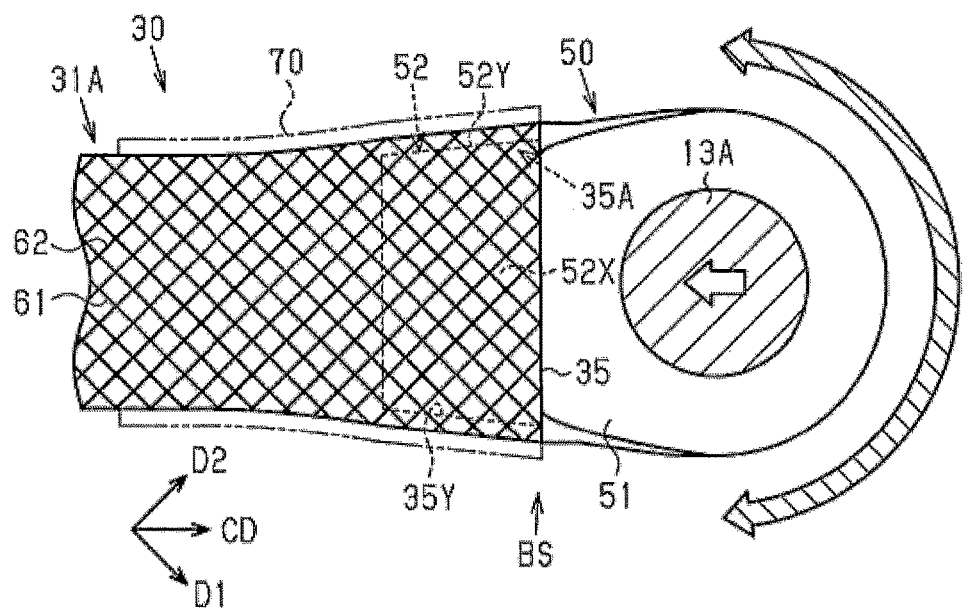
FIG. 11c is a schematic side view of a part of the link body.

As indicated by the white arrow in FIG. 11c, when a compressive load is imparted to the bush 50, the first fibers 61 and the second fibers 62 included in the link body 30 may receive a force. In addition, as shown in FIG. 11c, the inner surfaces 35Y of the opening portion 35 of the link body 30, which may be in surface contact with the side surfaces 52Y of the insertion projection 52 of the bush 50, may receive a force. Although not shown in FIG. 11c, the inner surfaces 35X of the opening portion 35, which may be in surface contact with the planar surfaces 52X of the insertion projection 52, may receive a force. Further, since the reinforcement member 70 may produce a large pressure between the inner surfaces 35X, 35Y of the opening portion 35 and the planar surfaces 52X and the side surfaces 52Y of the insertion projection 52, the insertion projection 52 may have less tendency to be moved with respect to the opening portion 35 toward the proximal side of the leg 31A. The surface contact may suppress stress concentration and eliminate the need of excessively increasing the strength as compared to point contact and line contact, thereby to ensure the necessary strength and reduce the weight of the bush supporting structure BS.

As indicated by the shaded arrows in FIG. 11c, when a torsional load is imparted to the bush 50, a force may be imparted to the first fibers 61 and the second fibers 62 included in the link body 30 (the leg 31A) via the fibers 61 to 63 wound around the outer peripheral surface 51C of the bush body 51 (the third fibers 63 are omitted in FIG. 11c). The first fibers 61 and the second fibers 62 included in the link body 30 (the leg 31A) may be dragged in the first direction D1 and the second direction D2, respectively. The first fibers 61 and the second fibers 62 included in the link body 30 (the leg 31A) may receive the torsional load imparted to the bush 50. Thus, the legs 31A, 31B can support the bush 50 against the torsional load imparted to the bush 50.

This embodiment may produce the following advantageous effects. (1) The first fibers 61 and the second fibers 62 may be woven together. Therefore, the frictional force acting between the first fibers 61 and the second fibers 62 may increase the binding force between the fibers 61, 62, as compared to an arrangement in which the first fibers 61 and the second fibers 62 are not woven together, that is, one of the first fibers 61 and the second fibers 62 may be formed on the other of the first fibers 61 and the second fibers 62. The strength of the link body 30 may thus be increased. In addition, since the third fibers 63 may also be woven with the first fibers 61 and the second fibers 62, the strength of the link body 30 may further be increased.

(2) The third fibers 63 may include fibers wound around the outer peripheral surface 51C of the bush body 51 in a first winding direction (such as indicated by the arrow Y1 in FIG. 8a) and fibers wound in a second winding direction (such as indicated by the arrow Y2 in FIG. 8b) opposite to the first winding direction. Therefore, the portion of the third fibers 63 included in the supporting portion 37 at which the third fibers 63 may start to be wound around the bush 50 may not be bent or twisted as compared to the case where the third fibers 63 are wound in one circumferential direction of the bush 50. The tensile load can be withstood in a good balance in the longitudinal direction CD.

(3) Since all of the fibers 61 to 63 included in the link body 30 may be wound around the bush 50, the tensile load produced between the link body 30 and the bush 50 may be received by all of the fibers 61 to 63. Therefore, the bush 50 can be supported more firmly with a smaller number of fibers, thereby to further effectively ensure necessary strength and reduce the weight of the bush supporting structure BS.

(4) Since the link body 30 may include layers of the woven fibers 61 to 63 stacked together, the strength of the link body 30 may be increased as compared to the case where the link body 30 includes a single layer.

(5) Since the first fibers 61 and the second fibers 62 extending from the opening portion 35 in the side surfaces 31Y of the legs 31A, 31B may be wound around the bush 50 in opposite directions, at least one of the first fibers 61 and the second fibers 62 may not be excessively bent or twisted. The tensile load can be withstood in a good balance in the longitudinal direction CD.

(6) The third fibers 63 extending from the opening portion 35 in the side surfaces 31Y of the legs 31A, 31B may diverge in two directions and may be wound around the bush 50 in opposite directions. Thus, the third fibers 63 may not be excessively bent or twisted as compared to the case where the third fibers 63 extending from the opening portion 35 in the side surfaces 31Y of the legs 31A, 31B are wound around the bush 50 in one direction. Therefore, the tensile load can be withstood in a good balance in the longitudinal direction.

(7) Since the fibers 61 to 63 may be wound around the outer peripheral surface 51C of the bush body 51 of the bush 50 so as to form layers stacked together, the area of the outer peripheral surface 51C of the bush body 51 may be smaller as compared to the case where the fibers 61 to 63 are wound around the outer peripheral surface 51C of the bush body 51 so as not to form layers stacked together. Accordingly, it may be possible to ensure the necessary strength and reduce the weight of the bush supporting structure BS.

(8) The insertion projection 52 of the bush 50 may have tapers 52A, 52B tapered toward the end thereof. Thus, when a compressive load is imparted to the bush 50, the tapers 52A, 52B may contact the opening portions 35 of the legs 31A, 31B, such that the link body 30 may support the bush 50.

(9) The opening portions of the leg 31A, 31B may have tapers 35A, 35B with an opening area larger toward the end thereof. Thus, when a compressive load is imparted to the bush 50, the tapers 35A, 35B may contact the insertion projection 52 of the bush 50, such that the link body 30 may support the bush 50. In addition, the taper 52A of the insertion projection 52 may be in surface contact with the taper 35A of the opening portion 35, and the taper 52B of the insertion projection 52 may be in surface contact with the taper 35B of the opening portion 35. Accordingly, the link body 30 can support the bush 50 more firmly.

(10) The reaction link 20 may include a reinforcement member 70 reinforcing the fixation of the bush 50 by the supporting member 37. Thus, the supporting portion 37 and the bush 50 can be fixed together more firmly.

(11) Since the reinforcement member 70 may be provided on the portion of the link body 30 in which the insertion projection 52 of the bush 50 overlaps the opening portion 35, the opening portion 35 may be pressed against the insertion projection 52. Thus, when a compressive load is imparted to the bush 50, the bush 50 may have less tendency to be moved relative to the link body 30.

(12) Since the reinforcement member 70 may fix the terminal end portions of the fibers 61 to 63 included in the supporting portion 37, the terminal end portions of the fibers 61 to 63 can be restrained from being removed from the legs 31A, 31B.

(13) The reinforcement member 70 may be positioned on the outer side of the terminal end portions of the fibers 61 to 63 included in the supporting portion 37 on the portion of the link body 30 in which the insertion projection 52 of the bush 50 overlaps the opening portion 35. Thus, when a compressive load is imparted to the bush 50, the reinforcement member 70 can prevent the widening of the opening portion 35. As a result, the link body 30 and the bush 50 can be supported firmly without increase of the size of the bush supporting structure BS.

(14) The reinforcement member 70, which may be constituted by the fiber 71, can be manufactured by the same winding machine as the link body 30. Thus, manufacture of the bush supporting structure BS can be facilitated.

(15) Since the fiber 71 is wound regularly, the opening portion 35 of the leg 31A including the supporting portion 37 may be restrained from being excessively expanded. Thus, increase of the size of the bush supporting structure BS can be restrained.

(16) Since the bush body 51 of the bush 50 is provided with a pair of ribs 51B, when the fibers 61 to 63 included in the supporting portion 37 are wound around the outer peripheral surface 51C of the bush body 51, the fibers 61 to 63 may be restrained by the ribs 51B from moving in the axial direction 11. When the fibers 61 to 63 are wound around the outer peripheral surface 51C of the bush body 51, the fibers 61 to 63 may be restrained from deflecting from the outer peripheral surface 51C. Thus, winding of the fibers 61 to 63 around the outer peripheral surface 51C of the bush body 51 can be facilitated.

Variations

Figure 12:
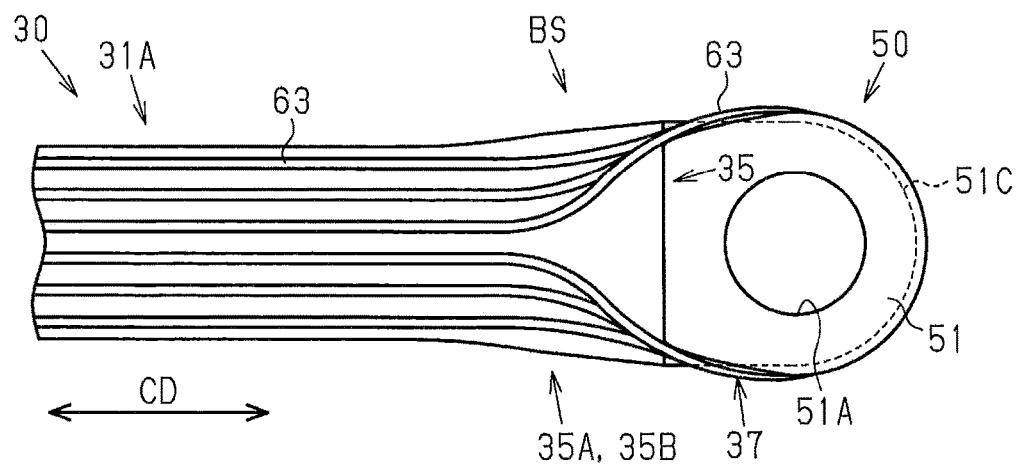
FIG. 12 is a schematic side view of a part of the link body and the bush in a variation of the aircraft reaction link.

The description about the above embodiment illustrated a non-limiting example of a supporting structure for a force transmission member, an aircraft reaction link, a flight control surface driving unit, a method of mounting a force transmission member, and a method of manufacturing aircraft reaction link according to the present invention. Any of the following variation embodiments and any combination of two of the following variation embodiments can be used to implement a supporting structure for a force transmission member, an aircraft reaction link, a flight control surface driving unit, a method of mounting a force transmission member, and a method of manufacturing aircraft reaction link according to the present invention. It should be noted that FIG. 12 shows only the third fibers 63 and does not show the first fibers 61 and the second fibers 62 for convenience.

Variation 1

In the above embodiment, it may also be possible that any two of the fibers 61 to 63 extending from the opening portion 35 of the leg 31A are all wound around the outer peripheral surface 51C of the bush body 51, and a part or all of the remaining one of the fibers 61 to 63 are cut at the end of the opening portion 35 and are not wound around the outer peripheral surface 51C, so as to form the supporting portion 37. Additionally, it may also be possible that any one of the fibers 61 to 63 are all wound around the outer peripheral surface 51C of the bush body 51, and a part or all of the remaining two of the fibers 61 to 63 are cut at the end of the opening portion 35 and are not wound around the outer peripheral surface 51C, so as to form the supporting portion 37. If the strength required for the link body 30 is larger than the strength required for supporting the bush body 51, a part or all of the fibers 61 to 63 may be cut to reduce the weight of the fibers, so as to further reduce the weight while ensuring the necessary strength of the bush supporting structure. Further, since a part or all of the fibers 61 to 63 are not wound around the bush body 51, the production time is shorter and thus the productivity of the bush supporting structure BS is higher as compared to the case where the fibers 61 to 63 are all wound around the bush body 51. As a smaller number of fibers are wound around the bush body 51, the productivity of the bush supporting structure BS may be higher. The same modification can be applied to the fibers 61 to 63 extending from the opening portion 35 of the leg 31B so as to produce the same effects.

Variation 2

In the above embodiment, it may also be possible to modify the method of winding the fibers 61 to 63 included in the supporting portion 37 around the outer peripheral surface 51C of the bush body 51 as described in (a) to (c) below. This modification may enable winding the fibers in a lump and thus simplify the manufacturing equipment and work as compared to the case where the fibers are wound from two directions. (a) Among the fibers 61 to 63 included in the supporting portion 37, the first fibers 61 and the second fibers 62 may be wound in only one circumferential direction of the outer peripheral surface 51C of the bush body 51. (b) Among the fibers 61 to 63 included in the supporting portion 37, the third fibers 63 may be wound in only one circumferential direction of the outer peripheral surface 51C of the bush body 51. (c) All of the fibers 61 to 63 included in the supporting portion 37 may be wound in only one circumferential direction of the outer peripheral surface 51C of the bush body 51.

Variation 3

Figure 13:
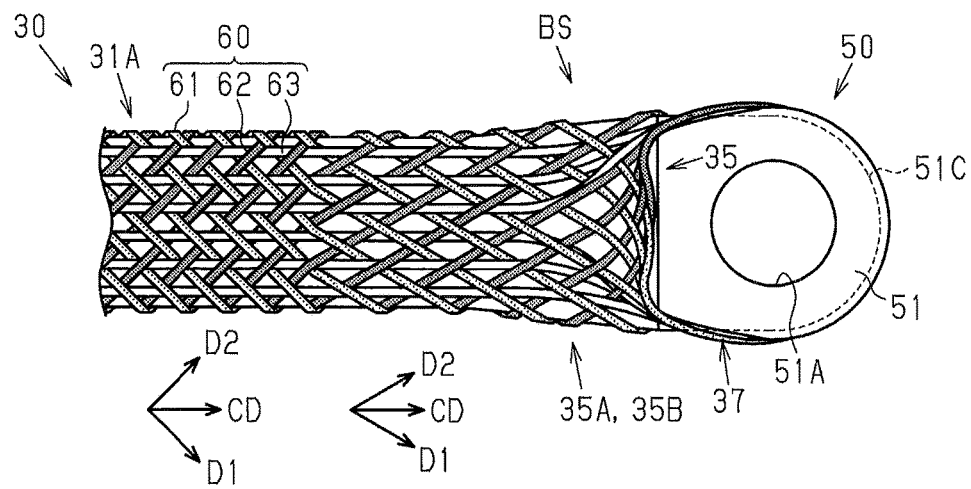
FIG. 13 is a side view of a part of the link body and the bush in a variation of the aircraft reaction link.
Figure 14:
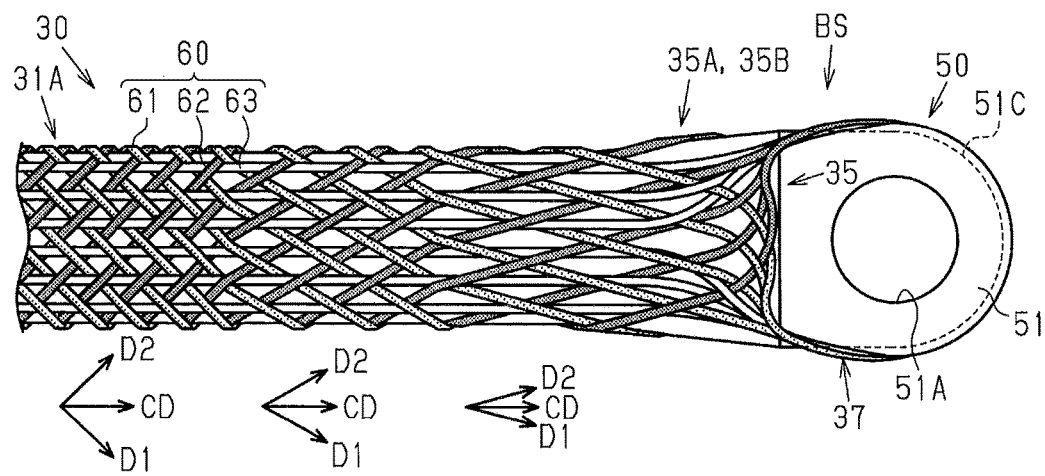
FIG. 14 is a side view of a part of the link body and the bush in a variation of the aircraft reaction link.

In the above embodiment, it may also be possible to modify the angles of fibers, represented by angles (acute angles) of the first direction D1 and the second direction D2 with respect to the longitudinal direction CD, as described in (a) and (b) below. (a) As shown in FIG. 13, the angles of fibers in the opening portion 35, which is in the link body 30 and close to the supporting portion 37, may be smaller than those in portions of the link body 30 farther from the supporting portion 37 than the opening portion 35. With this arrangement, when the first fibers 61 and the second fibers 62 included in the supporting portion 37 are wound around the bush body 51, the first fibers 61 and the second fibers 62 may be restrained from being bent or twisted acutely. Therefore, the deformation of the link body 30 due to the tensile load can be restrained, and the bush 50 can be supported firmly by the first fibers 61 and the second fibers 62. Simultaneously, the first fibers 61 and the second fibers 62 can receive the tensile load more efficiently. (b) As shown in FIG. 14, the angles of the fibers may be smaller toward the supporting portion 37 of the link body 30. With this arrangement, manufacture of the link body 30 can be facilitated as compared to the case where the angles of the first fibers 61 and the second fibers 62 vary discretely when the first fibers 61 and the second fibers 62 included in the supporting portion 37 are wound around the bush body 51. Particularly as compared to the case where the angles of the fibers are acutely reduced in a portion close to the bush body 51, the first fibers 61 and the second fibers 62 may be restrained from being bent or twisted acutely.

Variation 4

In the above embodiment, it may also be possible to modify the third fibers 63 as described in (a) and (b) below. In addition, the third fibers 63 may be omitted in the above embodiment. (a) The third fibers 63 may not be disposed on one to three of four side surfaces of the legs 31A, 31B. (b) The third fibers 63 may extend in a direction not parallel with the longitudinal direction CD. For example, the third fibers 63 may intersect the longitudinal direction CD.

Variation

Figure 15:
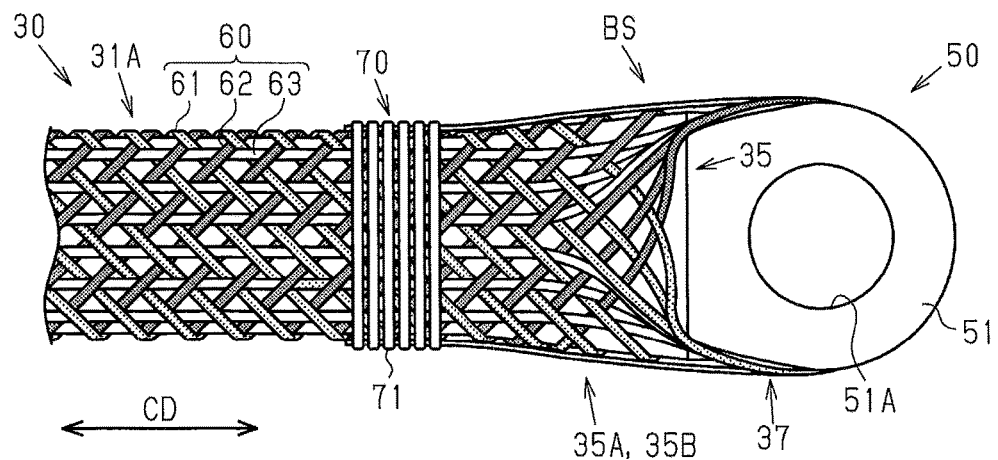
FIG. 15 is a side view of a part of the link body and the bush in a variation of the aircraft reaction link.
Figure 16:
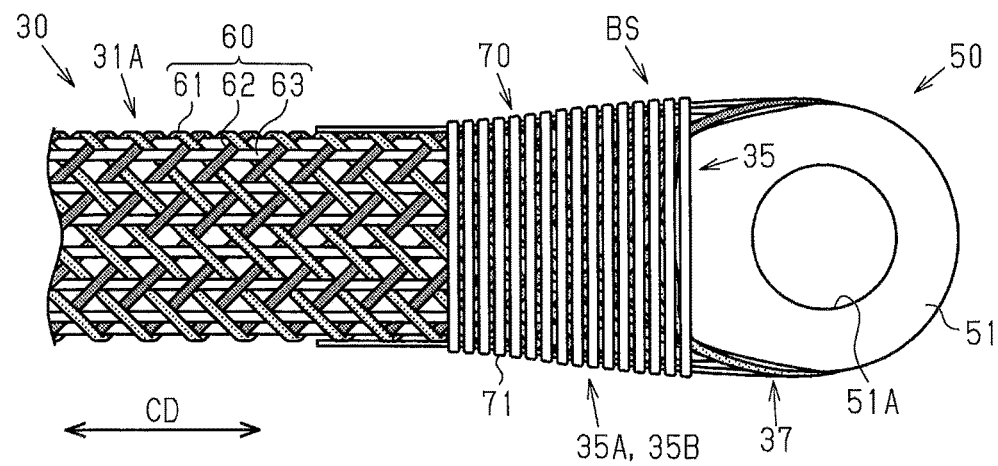
FIG. 16 is a side view of a part of the link body and the bush in a variation of the aircraft reaction link.
Figure 17:
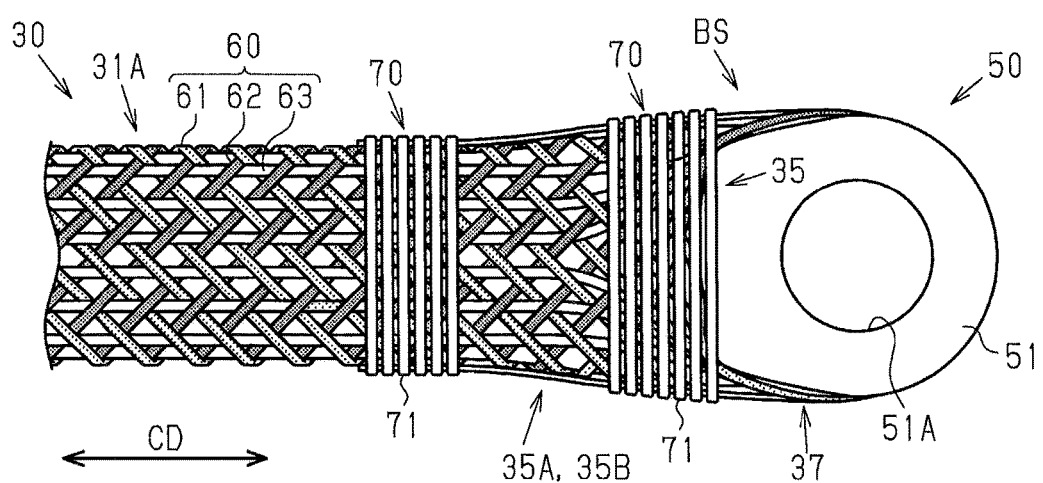
FIG. 17 is a side view of a part of the link body and the bush in a variation of the aircraft reaction link.

In the above embodiment, it may also be possible that the fiber 71 of the reinforcement member 70 is wound around the leg 31A as described in (a) to (h) below. Additionally, the reinforcement member 70 may also be mounted on the leg 31B in the same manner. (a) As shown in FIG. 15, the fiber 71 may be wound around only the terminal end portions of the fibers 61 to 63 extending toward the proximal side of the leg 31A beyond the tapers 35A, 35B of the opening portion 35. This arrangement may prevent the terminal end portions of the fibers 61 to 63 from being removed due to the shearing force produced by a tensile force imparted to the bush body 51 and may further reduce the weight. (b) As shown in FIG. 16, the fiber 71 may be wound around only the tapers 35A, 35B of the opening portion 35 of the leg 31A. This arrangement may effectively prevent the fibers 61 to 63 from being removed due to expansion of the opening portion 35 when a compressive force is imparted so as to press-fit the bush body 51 into the opening portion 35. Accordingly, it may be possible to ensure the necessary strength against the compressive force and reduce the weight of the bush supporting structure BS. (c) As shown in FIG. 17, the fiber 71 may be wound around the terminal end portions of the fibers 61 to 63 extending toward the proximal side of the leg 31A beyond the tapers 35A, 35B of the opening portion 35, and the distal end portions of the tapers 35A, 35B of the opening portion 35 of the leg 31A. Thus, a plurality of fibers 71 may be disposed on the leg 31A so as to be separated from each other. This arrangement may prevent the terminal end portions of the fibers 61 to 63 from being removed due to the shearing force produced by a tensile force imparted to the bush body 51 and may further reduce the weight. Further, this arrangement may effectively prevent the fibers 61 to 63 from being removed due to expansion of the opening portion 35 when a compressive force is imparted so as to press-fit the bush body 51 into the opening portion 35. Accordingly, it may be possible to ensure the necessary strength against the compressive force and reduce the weight of the bush supporting structure BS. Further, since a plurality of fibers 71 are disposed so as to be separated from each other, it may be possible to ensure the necessary strength and reduce the weight of the bush supporting structure BS, as compared to the case where the fiber 71 is disposed on the entire surface. (d) The fiber 71 may be wound around the proximal side of the leg 31A beyond the terminal end portions of the fibers 61 to 63. (e) The fiber 71 may be wound around either only a part of the distal end portions of the tapers 35A, 35B of the opening portion 35 in the leg 31A or only a part of the proximal portion of the tapers 35A, 35B. (f) The fiber 71 may be wound around the legs 31A, 31B so as to extend neither in parallel with nor orthogonally to the direction in which the legs 31A, 31B extend. (g) The fiber 71 may include a plurality of string-like fibers like the first fibers 61 and the second fibers 62 woven together and may be wound around the legs 31A, 31B. (h) The fiber 71 may be wound around the legs 31A, 31B so as to form layers stacked together. These arrangements may increase the strength of the bush supporting structure BS against the compressive force.

Variation 6

In the above embodiment, it may also be possible that the fiber 71 of the reinforcement member 70 is replaced with an adhesive, a heat contraction tube, a tape, or an annular member divided into a plurality of parts.

Variation 7

In the above embodiment, the reinforcement member 70 may be omitted. In this case, for example, the terminal end portions of the fibers 61 to 63 included in the supporting portion 37 may be woven again with the fibers 61 to 63 included in the side surfaces 31Y of the opening portion 35 of the legs 31A, 31B.

Variation 8

In the above embodiment, it may also be possible to enlarge a gap between the fibers 61 to 63 woven together and wound to form the link body 30, insert the bush 50 into the enlarged gap, and set the resin permeating the fibers 61 to 63 in the final bush fixation step. Thus, the bush 50 may be fixed at the end portion of the link body 30. In this case, the opening portion 35 may be omitted from the legs 31A, 31B of the link body 30, and the insertion projection 52 may be omitted from the bush 50. The ribs 51B may also be omitted from the bush body 51. Thus, the bush 50 may be fixed by a method other than winding the fibers 61 to 63.

Variation 9

In the above embodiment, it may also be possible that a plurality of bushes 50 are arranged on the longitudinal end of the core 36 at intervals in the longitudinal direction CD. In this case, the bushes 50 may be supported on the legs 31A, 31B by the supporting portion 37.

Variation 10

In the above embodiment, it may also be possible that after the fibers 60 are wound around the core 36, the insertion projection 52 of the bush 50 is inserted into the opening portion 35 of the legs 31A, 31B to connect the core 36 and the bush 50.

Variation 11

In the above embodiment, it may also be possible that the reaction link 20 is indirectly connected to the flight control surface 101 or the actuator 10. In this case, for example, the head 40 of the reaction link 20 may be provided with a connection portion such as a screw portion or a hole instead of the bearing hole 42A and the bearing 44. The connection portion may be connected to a link for connection with the flight control surface 101. If the link body 30 is straight or J-shaped, one end of the link body 30 may be connected to the bush 50, and the other end may be provided with a connection portion such as a screw portion or a hole. The connection portion may be connected to a link for connection with the flight control surface 101 or the actuator 10.

Variation 12

In the above embodiment, the bushes 50 may be replaced with other force transmission members. For example, the force transmission members may be shafts or bolts. In sum, any member other than the bushes 50 can be used as the force transmission member as long as it transmits a force to a structural member such as the link body 30. Further, the force transmission member can be made of not only metal materials but ceramic materials, fiber-reinforced plastics such as CFRP, or resin materials. In sum, the force transmission member can be made of any material as long as it can transmit a force to a structural member.

Variation 13

Figure 18:
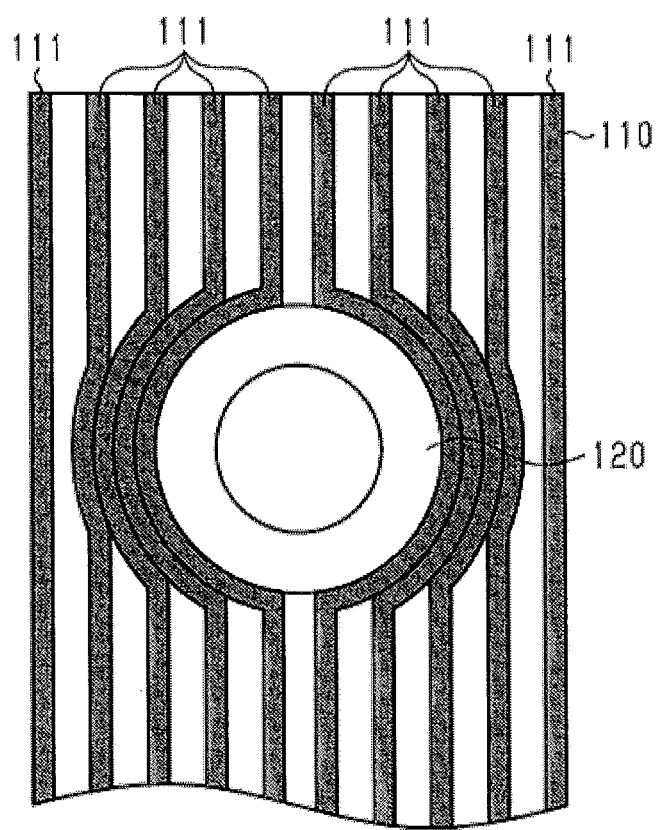
FIG. 18 is a plane view of a part of a structural member and a force transmission member in a variation of the supporting structure for the force transmission member.
Figure 19A:
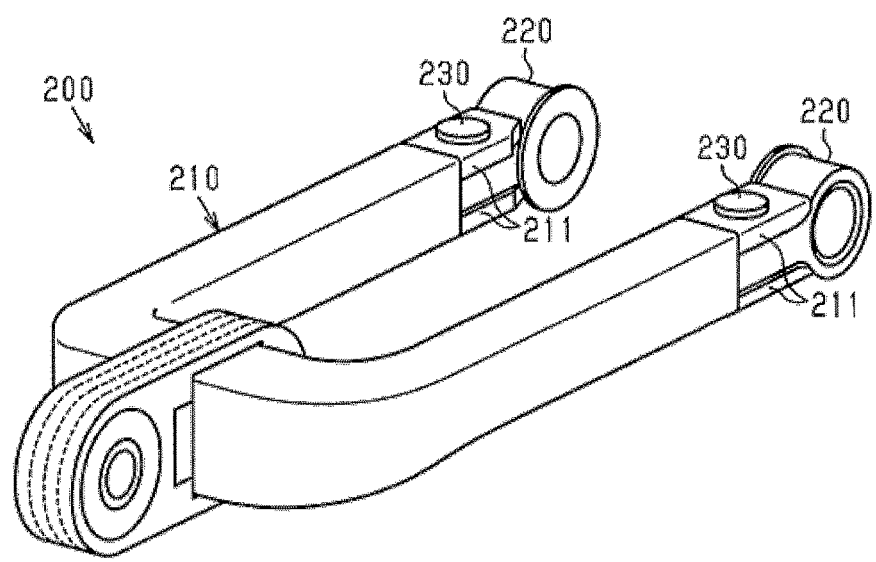
FIG. 19a is a perspective view of a conventional aircraft reaction link.
Figure 19B:
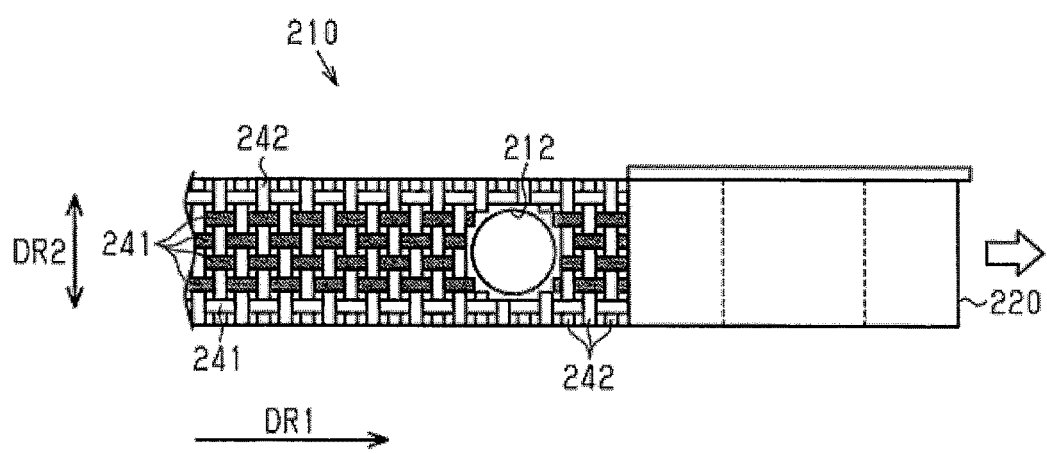
FIG. 19b is a plane view of a part of the link body of the conventional aircraft reaction link.

In the above embodiment, the bush supporting structure BS in which the fibers 61 to 63 included in the supporting portion 37 may be wound around the bush 50 to support the bush 50 is applied to an aircraft reaction link. This supporting structure for a force transmission member can be applied to other than aircraft reaction links. For example, as shown in FIG. 18, the supporting structure for a force transmission member may be configured such that a bush 120 serving as a force transmission member may be supported by a structural member 110 formed of fiber-reinforced plastics. The fibers 111 constituting the structural member 110 may support the bush 120 while extending continuously. In the variation 13, the bush 120 is a non-limiting example of the force transmission member shown in FIG. 18. For example, the force transmission member may have a hole like a bearing or may have a shaft instead of a hole. The hole or shaft may have a rectangular or polygonal section, as well as a circular section. The fibers 111 may be woven together, as the fibers 61 to 63 in the above embodiment.

It should be apparent to those skilled in the art that the present invention may be embodied in many other specific forms without departing from the scope of the invention. For example, some of the components may be omitted from the components described in the embodiments (or one or more aspects thereof). Further, components in different embodiments may be appropriately combined. The scope of the present invention and equivalence of the present invention are to be understood with reference to the appended claims.

What is claimed is:

1. A link for an aircraft, the link comprising:
   a structural member made of a fiber-reinforced plastic including continuous fibers, the continuous fibers of the fiber-reinforced plastic structural member include first fibers and second fibers that extend in a direction different from a longitudinal direction of the structural member;
   a force transmission member, the force transmission member being separately formed and the force transmission member being connected to the structural member via a connection portion, the force transmission member configured to receive a force and transmit the force to the structural member;
   a support structure for the force transmission member, wherein the support structure causes the structural member to support the force transmission member,
   the support structure comprising portions of the continuous fibers of the fiber-reinforced plastic structural member, including the first and second fibers, extending from the structural member and wrapping around the force transmission member, connected to the structural member via the connection portion, to support the force transmission member against the force,
   wherein the force transmission member includes a projection configured to be inserted into an opening portion formed in a distal end portion of the structural member,
   wherein the projection is tapered toward an end thereof,
   wherein the opening portion formed in the distal end portion of the structural member has a tapered shape with an opening area thereof larger toward a distal end of the opening portion, and
   wherein the connection portion includes the projection of the force transmission member and the opening portion of the structural member; and
   a reinforcement member provided over a region from a portion of the opening portion overlapping the projection to end portions of the continuous fibers of the fiber-reinforced plastic structural member, the reinforcement member causing the opening portion to press the projection to reinforce fixation between the structural member and the force transmission member and preventing the end portions of the continuous fibers from being removed.

2. The link of claim 1, wherein the continuous fibers included in the structural member include the first fibers extending in a first direction and the second fibers extending in a second direction different from the first direction, and
wherein the first fibers and the second fibers are woven together.

3. The link of claim 2, wherein angles of the continuous fibers formed by the first direction and the second direction with the longitudinal direction of the structural member in a portion of the structural member close to the force transmission member are smaller than those in a portion of the structural member distant from the force transmission member.

4. The link of claim 3, wherein the angles of the continuous fibers in the structural member are indiscretely smaller toward the force transmission member.

5. The link of claim 2, wherein a direction of winding the first fibers around the force transmission member is opposite to a direction of winding the second fibers around the force transmission member.

6. The link of claim 2, wherein the first direction and the second direction are different from the longitudinal direction of the structural member, and
wherein the continuous fibers included in the structural member further include third fibers extending along the longitudinal direction and wound around the force transmission member.

7. The link of claim 6, wherein the third fibers include fibers wound around the force transmission member in a first winding direction and fibers wound around the force transmission member in a second winding direction opposite to the first winding direction.

8. The link of claim 6, wherein only the third fibers are wound around the force transmission member.

9. The link of claim 1, wherein the continuous fibers wound around the force transmission member form layers stacked together.

10. The link of claim 1, wherein all of the continuous fibers included in the structural member are wound around the force transmission member.

11. The link of claim 1, wherein only a part of the continuous fibers included in the structural member is wound around the force transmission member.

12. The link of claim 1, wherein the reinforcement member is made of a continuous fiber included in the fiber-reinforced plastic and is wound on an outer side of the fibers supporting the force transmission member.

13. The link of claim 1, wherein the continuous fiber of the reinforcement member is wound regularly.

14. The link of claim 1, wherein the force transmission member has an outer peripheral surface around which the fibers are wound, and
wherein both axial ends of the outer peripheral surface of the force transmission member are provided with a rib extending from the outer peripheral surface of the force transmission member in a radial direction.

15. An aircraft reaction link directly or indirectly mounted on a flight control surface of an aircraft and connected to an actuator for driving the flight control surface, the aircraft reaction link comprising:

a force transmission member, the force transmission member being configured to slidably support the actuator;
a structural member, the structural member being configured to support the force transmission member, wherein the structural member made of a fiber-reinforced plastic including continuous fibers, the continuous fibers of the fiber-reinforced plastic structural member include first fibers and second fibers that extend in a direction different from a longitudinal direction of the structural member;
the force transmission member being separately formed and the force transmission member being connected to the structural member via a connection portion, the force transmission member configured to receive a force and transmit the force to the structural member; and
a support structure for the force transmission member, wherein the support structure causes the structural member to support the force transmission member,
the support structure comprising portions of the continuous fibers of the fiber-reinforced plastic structural member, including the first and second fibers, extending from the structural member and wrapping around the force transmission member, connected to the structural member via the connection portion, to support the force transmission member against the force, wherein the force transmission member includes a projection configured to be inserted into an opening portion formed in a distal end portion of the structural member,
wherein the projection is tapered toward an end thereof, and
wherein the opening portion formed in the distal end portion of the structural member has a tapered shape with an opening area thereof larger toward a distal end of the opening portion, and
wherein the connection portion includes the projection of the force transmission member and the opening portion of the structural member; and
a reinforcement member provided over a region from a portion of the opening portion overlapping the projection to end portions of the continuous fibers of the fiber-reinforced plastic structural member, the reinforcement member causing the opening portion to press the projection to reinforce fixation between the structural member and the force transmission member and preventing the end portions of the continuous fibers from being removed.

16. A flight control surface driving unit comprising:
the aircraft reaction link of claim 15; and
the actuator.

17. The link of claim 1, wherein, in supporting the force transmission member, the force transmission member is retained such that the first fibers and the second fibers produce a reaction force in a direction against the force transmitted to the structural member via the force transmission member.

* * * * *